US008941709B2

(12) United States Patent
Johnson et al.

(10) Patent No.: US 8,941,709 B2
(45) Date of Patent: Jan. 27, 2015

(54) VIDEO-ASSISTED SELF-SERVICE TRANSACTION DEVICE

(75) Inventors: Tyler R. Johnson, Tega Cay, SC (US); Therese H. Willis, Apopka, FL (US)

(73) Assignee: Bank of America Corporation, Charlotte, NC (US)

( * ) Notice: Subject to any disclaimer, the term of this patent is extended or adjusted under 35 U.S.C. 154(b) by 259 days.

(21) Appl. No.: 13/546,680

(22) Filed: Jul. 11, 2012

(65) Prior Publication Data

US 2013/0018788 A1    Jan. 17, 2013

Related U.S. Application Data

(60) Provisional application No. 61/506,381, filed on Jul. 11, 2011.

(51) Int. Cl.
*H04N 7/15* (2006.01)
*G07F 19/00* (2006.01)
*G06Q 20/18* (2012.01)
*H04N 7/14* (2006.01)

(52) U.S. Cl.
CPC .............. *G07F 19/201* (2013.01); *H04N 7/141* (2013.01); *G06Q 20/18* (2013.01)
USPC ................... 348/14.08; 348/14.01; 348/14.12; 705/43

(58) Field of Classification Search
CPC ......... H04N 7/14; H04N 7/141; H04N 7/142; H04N 7/147; H04N 7/152; G06Q 10/18; G07F 19/20
USPC ....................... 348/14.01–14.16; 705/43, 301
See application file for complete search history.

(56) References Cited

U.S. PATENT DOCUMENTS

| | | |
|---|---|---|
| 5,453,601 A | 9/1995 | Rosen |
| 5,455,407 A | 10/1995 | Rosen |
| 5,758,068 A | 5/1998 | Brandt et al. |
| 5,774,663 A | 6/1998 | Randle et al. |
| 5,866,889 A | 2/1999 | Weiss et al. |
| 5,898,154 A | 4/1999 | Rosen |
| 5,970,888 A | 10/1999 | Sheppard |
| 6,047,887 A | 4/2000 | Rosen |
| 6,078,900 A | 6/2000 | Ettl et al. |
| 6,122,625 A | 9/2000 | Rosen |

(Continued)

OTHER PUBLICATIONS

International Search Report for PCT/US12/46254 mailed Sep. 21, 2012.

(Continued)

*Primary Examiner* — Melur Ramakrishnaiah
(74) *Attorney, Agent, or Firm* — Banner & Witcoff, Ltd.; Michael A. Springs

(57) ABSTRACT

While performing or initiating a transaction with a self-service video transaction device, a user may interact with a video agent and a terminal associated therewith. An error may occur during the transaction. In response to detecting the error, video agent(s) having video or audio functionalities to service the error may be identified. Servicing the error may also be based on a length of a wait time to connect to an appropriate video agent. If the wait time exceeds a predetermined threshold, an error receipt identifying the error and other information may be printed by the self-service video transaction device. If the wait time does not exceed the predetermined threshold, a display device of the self-service video transaction device may display an option for the user to connect to the video agent terminal.

20 Claims, 21 Drawing Sheets

(56) References Cited

U.S. PATENT DOCUMENTS

| | | | |
|---|---|---|---|
| 6,131,810 A | 10/2000 | Weiss et al. | |
| 6,181,366 B1 | 1/2001 | Dezonno et al. | |
| 6,219,087 B1 | 4/2001 | Uiterwyk et al. | |
| 6,223,983 B1 | 5/2001 | Kjonaas et al. | |
| 6,226,623 B1 | 5/2001 | Schein et al. | |
| 6,237,846 B1 | 5/2001 | Lowell et al. | |
| 6,354,490 B1 | 3/2002 | Weiss et al. | |
| 6,547,133 B1 | 4/2003 | DeVries, Jr. et al. | |
| 6,715,670 B1 | 4/2004 | Swiatek et al. | |
| 6,748,102 B2 | 6/2004 | Prakash | |
| 6,789,733 B2 | 9/2004 | Terranova et al. | |
| 6,915,270 B1 | 7/2005 | Young et al. | |
| 6,918,536 B2 | 7/2005 | Nozaki et al. | |
| 7,051,096 B1 | 5/2006 | Krawiec et al. | |
| 7,266,503 B2 | 9/2007 | Cason et al. | |
| 7,322,516 B2 | 1/2008 | Savage et al. | |
| 7,373,309 B2 | 5/2008 | Nishikawa et al. | |
| 7,395,221 B2 | 7/2008 | Doss et al. | |
| 7,418,491 B2 | 8/2008 | Childress et al. | |
| 7,519,672 B2 | 4/2009 | Boss et al. | |
| 7,548,885 B2 | 6/2009 | Dutta et al. | |
| 7,555,462 B2 | 6/2009 | Dutta et al. | |
| 7,617,307 B2 | 11/2009 | Childress et al. | |
| 7,636,847 B2 | 12/2009 | Stone et al. | |
| 7,735,125 B1 | 6/2010 | Alvarez et al. | |
| 7,747,459 B2 | 6/2010 | Doss et al. | |
| 7,752,066 B2 | 7/2010 | Doss et al. | |
| 7,792,726 B2 | 9/2010 | Nishikawa et al. | |
| 7,814,016 B2 | 10/2010 | Pranger | |
| 2002/0128895 A1 | 9/2002 | Broderick et al. | |
| 2002/0143592 A1 | 10/2002 | Nishikawa et al. | |
| 2002/0152164 A1 | 10/2002 | Dutta et al. | |
| 2002/0152165 A1 | 10/2002 | Dutta et al. | |
| 2002/0152166 A1 | 10/2002 | Dutta et al. | |
| 2002/0152170 A1 | 10/2002 | Dutta et al. | |
| 2004/0093290 A1 | 5/2004 | Doss et al. | |
| 2004/0111328 A1 | 6/2004 | Espejo et al. | |
| 2004/0243453 A1 | 12/2004 | Call et al. | |
| 2005/0033624 A1 | 2/2005 | Dixon | |
| 2006/0129487 A1* | 6/2006 | Shafiee et al. | 705/50 |
| 2006/0282273 A1 | 12/2006 | Caswell et al. | |
| 2007/0145114 A1 | 6/2007 | Militello et al. | |
| 2007/0162316 A1 | 7/2007 | Kratschmer et al. | |
| 2007/0181674 A1 | 8/2007 | Taylor et al. | |
| 2007/0226035 A1 | 9/2007 | Doss et al. | |
| 2008/0021760 A1 | 1/2008 | Doss et al. | |
| 2008/0097883 A1* | 4/2008 | Savage et al. | 705/35 |
| 2008/0097902 A1 | 4/2008 | Nishikawa et al. | |
| 2008/0126163 A1 | 5/2008 | Hogan et al. | |
| 2008/0133262 A1 | 6/2008 | Nishikawa et al. | |
| 2008/0228547 A1 | 9/2008 | Doss et al. | |
| 2008/0255867 A1 | 10/2008 | Nishikawa et al. | |
| 2008/0270210 A1 | 10/2008 | Kratschmer et al. | |
| 2008/0300956 A1* | 12/2008 | Nishikawa et al. | 705/9 |
| 2009/0016496 A1 | 1/2009 | Bulmer | |
| 2009/0187463 A1 | 7/2009 | DaCosta | |
| 2009/0276358 A1 | 11/2009 | Dutta et al. | |
| 2009/0307115 A1 | 12/2009 | Espejo et al. | |
| 2010/0205641 A1 | 8/2010 | Charania et al. | |
| 2010/0250327 A1 | 9/2010 | Relyea, Jr. et al. | |
| 2010/0332388 A1 | 12/2010 | Rielly et al. | |
| 2011/0060685 A1 | 3/2011 | Pranger | |
| 2011/0066938 A1 | 3/2011 | Nageswaram et al. | |
| 2011/0261144 A1 | 10/2011 | Benefield et al. | |
| 2011/0261947 A1 | 10/2011 | Benefield et al. | |
| 2011/0309137 A1 | 12/2011 | Votaw et al. | |
| 2011/0313923 A1 | 12/2011 | Votaw et al. | |

OTHER PUBLICATIONS

Written Opinion of the International Searching Authority for PCT/US12/46254 mailed Sep. 21, 2012.
Unpublished U.S. Appl. No. 13/443,377, filed Apr. 10, 2012.
Unpublished U.S. Appl. No. 12/347,838, filed Dec. 31, 2008.

* cited by examiner

VIDEO-ASSISTED SELF-SERVICE TRANSACTION DEVICE

CROSS-REFERENCE TO RELATED APPLICATIONS

This application claims priority to U.S. provisional patent application Ser. No. 61/506,381, filed Jul. 11, 2011, entitled VIDEO-ASSISTED SELF-SERVICE TRANSACTION DEVICE. The prior application is herein incorporated by reference in its entirety.

BACKGROUND

Traditional automated teller machines (ATMs) facilitate self-service transactions by a user interacting with an ATM. Example transactions that may be performed through an ATM include funds withdrawals, deposits, and the like. Traditional ATMs, however, might not have the functionality to perform certain transactions that require interaction with, for example, a physical person at a banking center.

SUMMARY

By combining video and/or audio functionalities with a self-service device, a wider range of transactions may be conducted than is possible with a traditional ATM. Additionally, video and/or audio capabilities may permit video agents to handle user questions, errors, and the like. In some aspects, a system, apparatus, and/or computer readable medium may perform a method including: during a transaction between a user and a self-service video transaction device, detecting an error associated with the transaction; in response to detecting the transaction error, identifying a video agent terminal have video and audio functionalities to service the transaction error; determining whether a wait time for connection to the video agent terminal exceeds a predetermined threshold time; and if the wait time exceeds the predetermined threshold time, generating an error receipt and printing the error receipt by the self-service video transaction device, wherein the error receipt may include an identifier for the transaction error and contact information for resolution of the transaction error.

The method may further include: if the wait time does not exceed the predetermined threshold time, displaying, on a display device of the self-service video transaction device, an option to connect to the video agent terminal; in response to receiving a selection of the option to connect to the video agent terminal, connecting the self-service video transaction device to the video agent terminal when the video agent terminal becomes available, wherein the connection may include video and audio functionalities. The method may also include: in response to receiving the selection of the option to connect to the video agent terminal, transmitting the transaction error identifier and an indication of the time of the transaction error to the video agent terminal.

In some aspects, identifying the video agent terminal to service the transaction error may include: retrieving profile information for a video agent associated with the video agent terminal; comparing the transaction error identifier to the video agent's profile information; and in response to determining that the transaction error identifier matches the video agent's profile information, identifying the video agent terminal to service the transaction error. The method may include: subsequent to determining that the wait time exceeds the predetermined threshold time, determining that the wait time has fallen below the predetermined threshold time during the transaction; and in response to determining that the wait time has fallen below the predetermined threshold time during the transaction, displaying, on a display device of the self-service video transaction device, an option to connect to the video agent terminal. In some aspects, identifying the video agent terminal may include identifying a plurality of video agent terminals to service the transaction error, and determining whether the wait time exceeds a predetermined threshold time may include determining whether the wait time for the next available agent of the plurality of video agents exceeds the predetermined threshold time.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
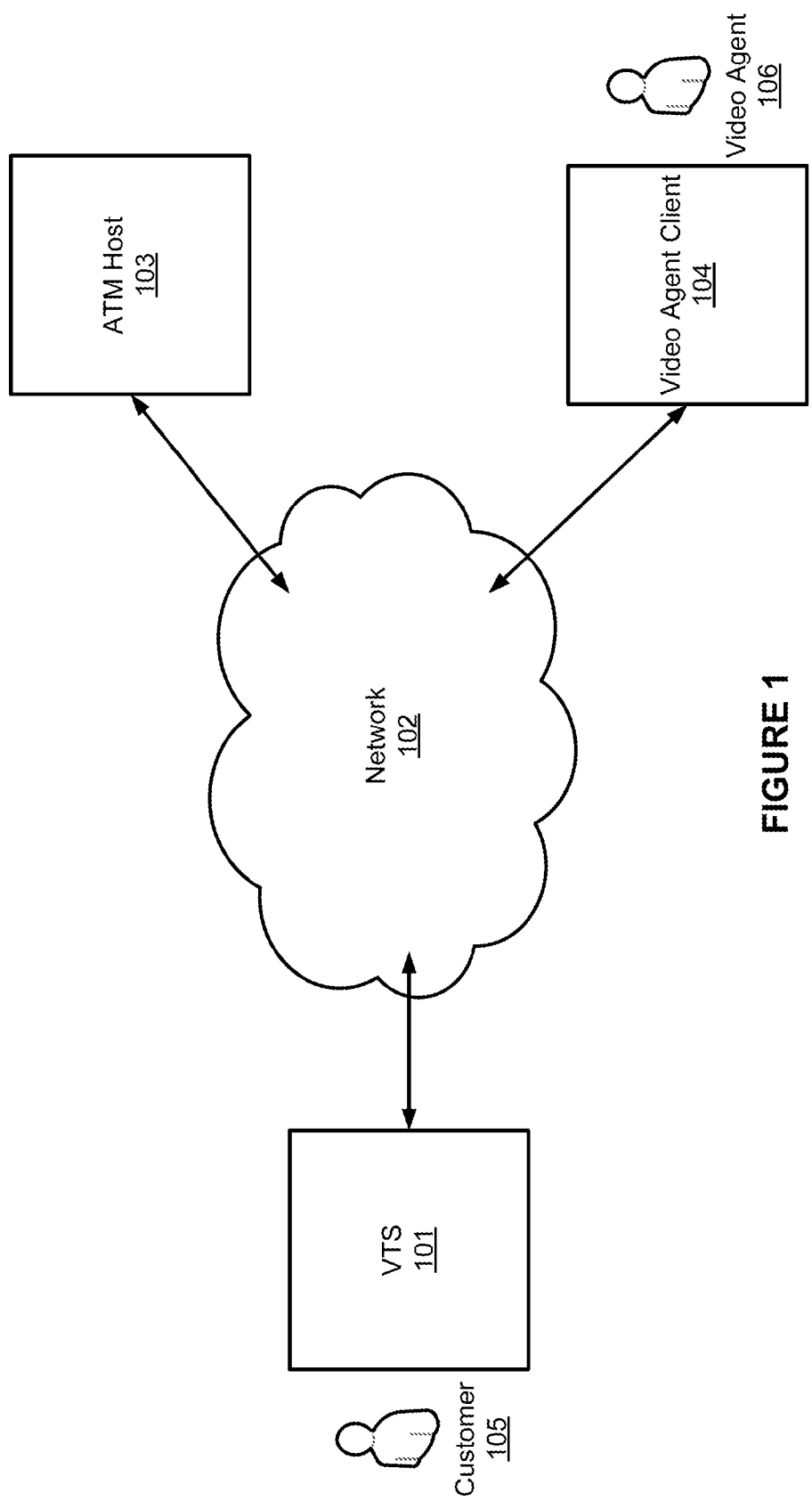
FIG. 1 is an example block diagram of a VTS 101 in the context of a system.

Various examples of a self-service transaction device having interactive audio and/or video capability are described herein, as well as examples of how such a device may be used. Also described is an example architecture that may allow a human, referred to herein as a video agent, to interact with such a device and the customer of such a device. A self-service transaction device having audio and/or video interaction capabilities will be referred to herein by way of example as a video transaction machine (VTS). A VTS may include some or all features of a conventional automated teller machine (ATM), and may further have a video camera, a microphone, a display screen, and/or a speaker, thereby providing interactive (bidirectional) audio and/or video communication between the VTS customer and the video agent. The VTS may also include a mechanism for receiving and/or scanning materials such as an identification card (e.g., driver's license) and to transmit an image of the scanned material to the video agent. Likewise, the video agent may utilize a terminal (e.g., a computer workstation) having a video camera, a microphone, a display screen, and/or a speaker.

Video and/or audio functionality may not always be available at a VTS. For instance, if video and/or audio interactive resources are overloaded such that no video agents are expected to be available for at least a threshold period of wait time (e.g., three minutes, or any other period of time as configured), then video and/or audio functionality may be temporarily disabled until such resources are more free (e.g., until a video agent is expected to be available in a shorter period of time than the threshold period of time). The network interconnecting the VTSs with the financial institution may send out a status message to the network of VTSs indicating whether video and/or audio functionality is currently available. Depending upon this availability, each VTS may dynamically provide an indication to customers (e.g., via the video display menu or external signage) as to whether video agent interactions are presently available.

The indication may also indicate the transactions currently available at the VTS depending on whether video and/or audio functionalities are currently available. In some aspects, the VTS may be able to provide more services and/or conduct more transactions when video and/or audio functionalities are currently available than when they are unavailable. The VTS having video and/or audio functionalities, in cooperation with a video agent (and video agent terminal), may be able to perform visual authentication of the user, such as the video agent comparing an image of the user (e.g., a scanned driver's license photo) to the user at the VTS. The VTS might not be able to authenticate using this method if video and/or audio functionalities have been disabled. Similarly, a VTS might not be configured to set up a recurring transfer of funds between bank accounts (within the same financial institution or between different financial institutions). A video agent interacting with the user, on the other hand, might be able to set up a recurring funds transfer from the video agent's terminal. Accordingly, a VTS having video and/or audio functionalities may be able to set up recurring funds transfers, whereas a VTS having video and/or audio functionalities disabled might not be able to set up recurring funds transfers for the user. Assuming that a VTS may perform check deposits and funds withdrawals, a VTS having video and/or audio functionalities available may display a list of available transactions, including check deposits, funds withdrawals, visual authentication, and recurring funds transfers. A VTS with video and/or audio functionalities unavailable may display a list of available transactions, including check deposits and funds withdrawal. By listing the available transactions, the customer may decide whether to initiate a particular transaction before even beginning interaction with the VTS. The foregoing examples are merely exemplary. For example, VTSs may be configured to set up recurring funds transfers even if video and/or audio functionalities are unavailable.

A VTS may have dual personalities—a fully automated self-service machine mode (such as a traditional non-video-agent-assisted ATM) and an assisted self-service mode, in which a video agent may be used to assist the customer. The video agent might not have full control of the VTS, and instead may be able to assist the customer to interact with the VTS and/or have the ability to interact with the VTS in a manner similar to the customer. The video agent may also have additional interaction abilities such as by confirming customer authentication or indicating approval to the VTS during certain transactions.

Even where the video agent interacts with the VTS, the VTS may still be responsible for dispensing media (e.g., cash, cards, and the like) at the request of the VTS customer, rather than this being the responsibility of the video agent. The VTS may be enabled via scripts to control dispensing of media, and the script may recognize the configuration of the VTS (e.g., health/status of required device components, whether video is currently enabled, whether the VTS is actually a VTS rather than a traditional ATM, and/or whether assistance may be provided by video, audio, or both). Likewise, the responsibility for performing cash balancing may be on the part of the VTS rather than the video agent.

Because video interaction may now be used, the video agent may be able to authenticate the VTS user even where the VTS user does not have a financial institution (e.g., bank) card for reading by the VTS. For instance, the video agent may authenticate the customer based on the customer's face and/or the customer's driver's license or other identification card or method. Thus, the VTS may allow for more cardless transaction functionality without necessarily adding undue risk of deceptive transactions.

Language and other preferences may be linked to the customer's account. For instance, when the customer logs into the VTS (e.g., by swiping a financial institution card and entering a PIN), the customer's preferences associated with that account may be pulled from a preferences database. Where the preferences indicate a preferred language, any invoking of the video agent may automatically invoke a video agent capable of conversing in the preferred language. If there is no preferred language in the preferences database, then the customer may be prompted to choose a language other than a default language. Thus, the routing of the communication link between the VTS and a video agent may depend upon the language and/or other preferences for a given customer. Likewise, a particular type of video agent (and routing thereof) may be chosen depending upon the type of assistance that the VTS determines is needed. And, there may be certain instances (such as error conditions) where a video agent is automatically invoked, even without necessarily requiring a request for the video agent from the customer.

Thus, various features are described herein, by way of example, that may leverage features and functions traditionally used in conventional automated teller machine (ATM) transaction processing, as well as feature/functions that may be added due to a new video interactive capability that may be provided by the machines. This may allow a financial institution, such as but not limited to a bank, to potentially migrate transactions to a more cost effective environment. These features/functions may be automated to potentially improve the customer experience and/or leverage the systems and interfaces within the ATM and Contact Center channels. This document describes examples of a solution architecture for many possible capabilities of ATM+Teller+Contact Center transactions.

Various solutions as described herein may include a multi-client application that integrates an ATM client for servicing (and monitoring) automated transactions utilizing ATM hardware/software for completing customer transactions, as well as a Contact Center client for routing and interfacing video agents (who may also be referred to in the text herein and in the drawings as contact center agents or associates) to support the fulfillment of personalized service via video conferencing support (e.g., using "Picture-in-a-Picture" (PiP)) between the customer and the video agent when needed or desired. Such an ATM or other self-service transaction device having the video agent feature may be referred to herein as a video-supported transaction machine (VTS).

A VTS may include a Contact Center (CC) agent and an interface to financial institution Contact Center systems to provide personalized service when needed, and may route customer traffic based on, for example, specified preferences, specified transaction criteria, and/or time-of-day (TOD) criteria.

FIG. 1 is an example block diagram of a VTS 101 in the context of a system that also includes a network 102, a ATM host 103, a VTS/CC client 104, a customer 105, and a video agent 106. It is noted that any or all of the blocks shown in FIG. 1, and in any of the other figures, may be partially or fully implemented as software, hardware, firmware, or any combination or subcombination thereof. Where implementations involve software or firmware, such software may be stored on one or more tangible and/or non-transitory computer-readable media (e.g., memory, magnetic disc, optical disc, and the like) as computer-executable instructions, and such stored instructions may be executed by a computer (e.g., personal computer, server, dedicated computing circuitry, and the like) to perform the functions described herein.

Examples of transactions that may be performed by a VTS may include deposits, deposits with cash back, commercial deposits, cashing of a check, withdrawal of money, advances of money, transfer of funds, payment of funds, obtaining of statements, redeeming a US savings bond, performing a change order, cashier check sale, money order sale, traveler check sale, and balance inquiry.

An existing ATM environment may be modified for VTS implementation. This may potentially allow for a consistent Customer Experience and/or leverage existing, proven technologies. For example, Host 103 may be implemented by an ATM Host, which may include hardware, software, and/or firmware components used to host an ATM system and network. Where a feature/function does not currently exist, ATM host 103 may be modified or interfaced to an existing Enterprise service to fulfill those transactions. ATM host 103 may, for example, be the System of Record (SOR) for VTS transaction processing.

Figure 2:
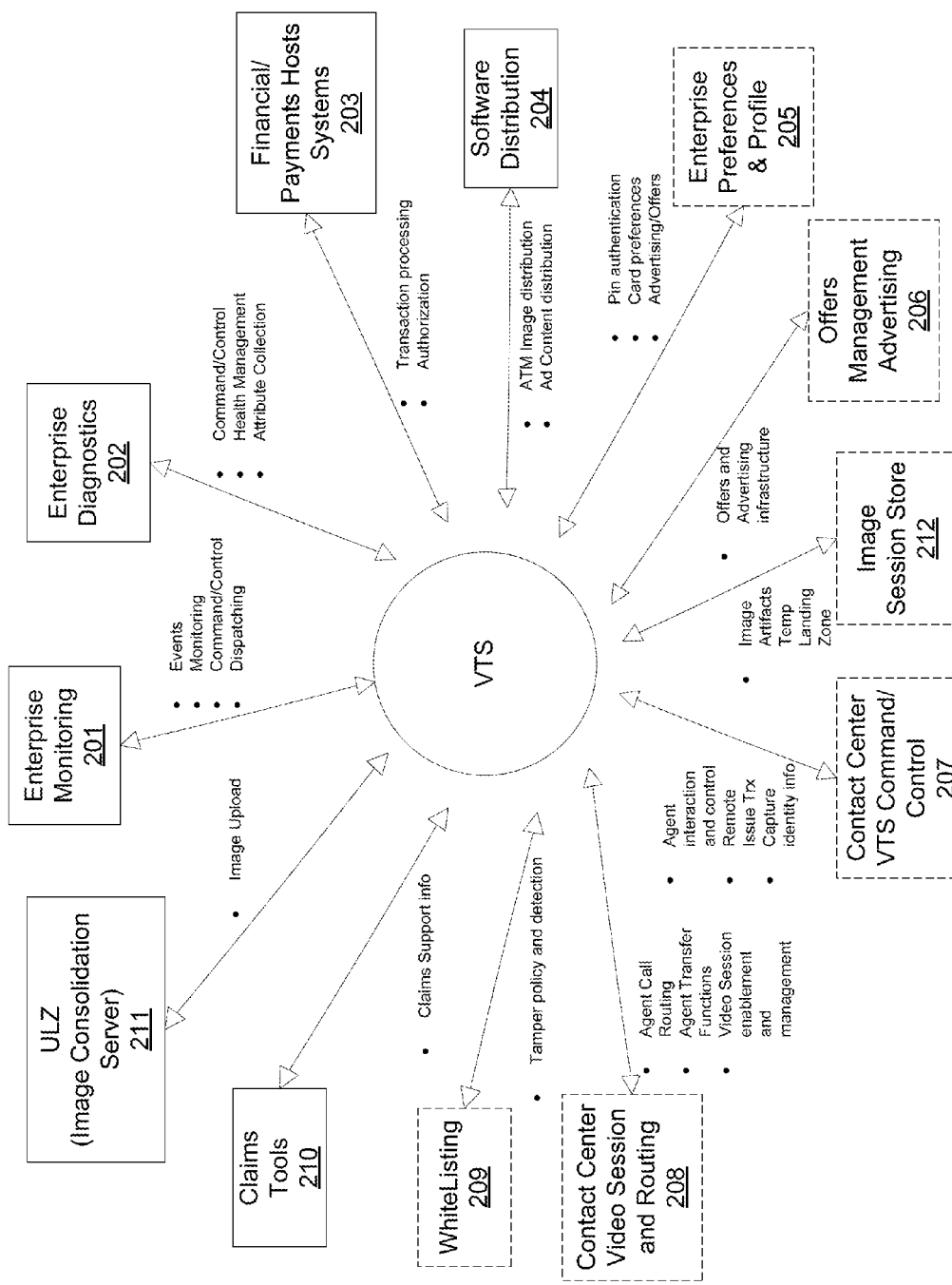
FIG. 2 is a block diagram of an example system environment in which VTS 101 may be situated.

FIG. 2 is a block diagram of an example system environment in which VTS 101 may be situated. Any of the blocks of FIG. 2 may be implemented by VTS 101 and/or by a system physically outside of VTS 101. The example environment may include an enterprise monitoring function 201, which may provide for monitoring of events, command and control functionality, and dispatching functionality. The environment may further include an enterprise diagnostics function 202, which may provide command and control, VTS health management, and attribute collection functionality. The environment may further include financial/payments host function 203, which may provide for financial transaction processing and authorization. The environment may further include a software distribution function 204, which may provide for ATM and/or VTS software image distribution and/or advertising content distribution (where VTS 101 may display advertising). The environment may further include an enterprise preferences and profile function 205, which may provide for PIN authentication, card preferences, and/or advertising functionality.

The environment may further include an offers management function 206, which may provide for offers and other advertising using an enterprise framework infrastructure. The environment may also include an image session store function 212, which may provide a temporary data storage location, such as a temporary landing zone, for image artifacts. The environment may further include a contact center VTS command/control function 207, which may provide for agent interaction and control, remote issue transmittal, and/or capture identity functionality. The environment may further include a contact center video session and routing function 208, which may provide for agent call routing and/or transfer functions, and/or for video session enablement and management functionality. The environment may further include a WhiteListing function 209, which may provide for tamper policy and detection functionality. The environment may further include a claims tools function 210, which may provide for claims support functionality. The environment may further include an image consolidation server (e.g., a universal landing zone) 211, which may provide for image uploads to the system from the VTS.

Figure 3:
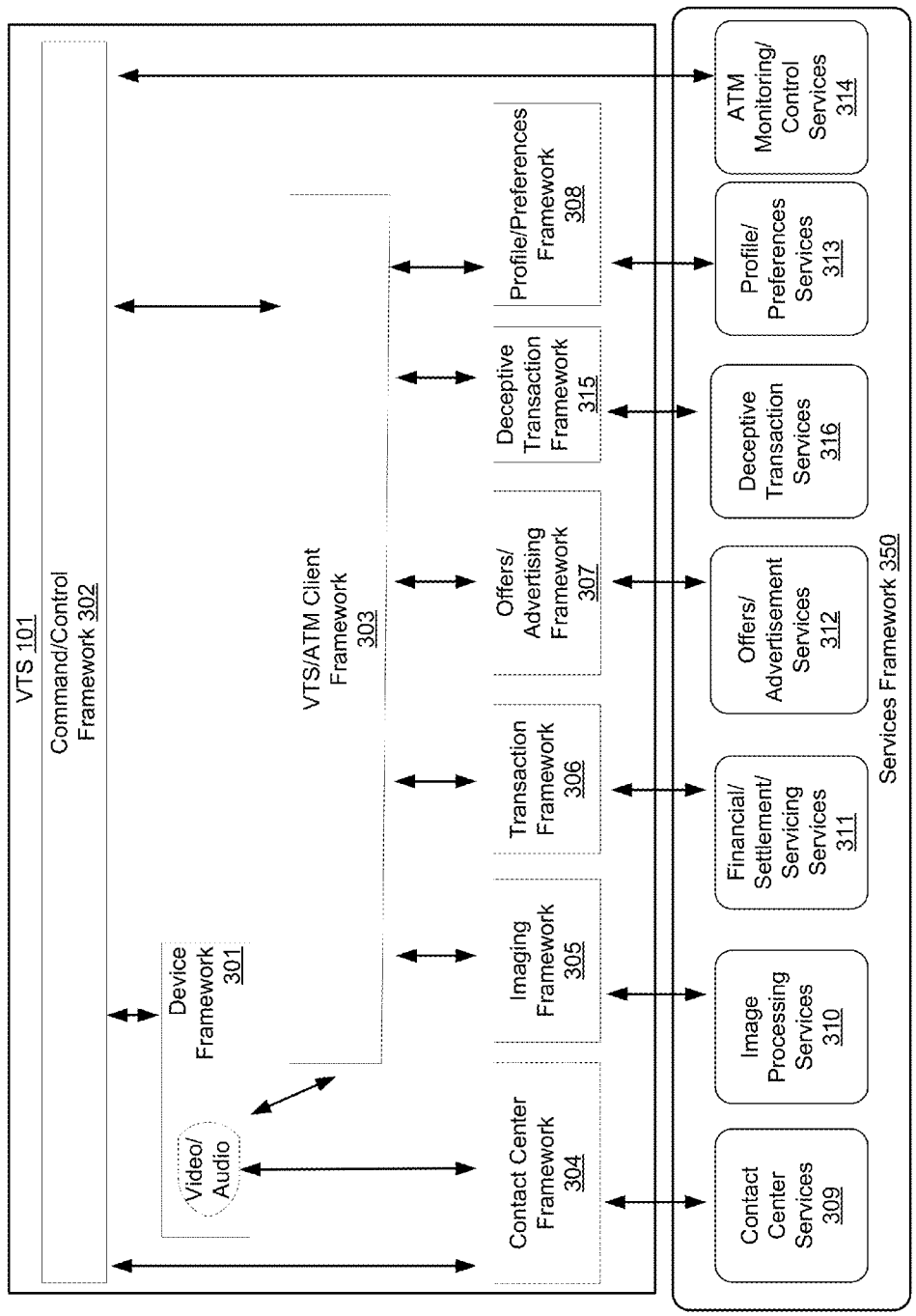
FIG. 3 shows an example of overall functional frameworks or functional "domains" that may be present in a configuration or topology of a VTS.

FIG. 3 shows an example of overall functional frameworks or functional "domains" that may be present in a configuration or topology of VTS 101. Any feature, function or process, whether it be a software component or business process, may be able to fit into one or many framework domains such as those shown in FIG. 3. VTS 101 may include, for example, a device framework 301, a command/control framework 302, a VTS/ATM client framework 303, a contact center framework 304, a check imaging framework 305, a transaction framework 306, an offers/advertising framework 307, a profile/preferences framework 308, and/or a deceptive transaction framework 315. A services framework 350, which may be part of a larger system outside of VTS 101 (e.g., part of network 102, ATM host 103, and/or VTS/CC client 104) may include, for example, a contact center services framework 309, an image processing services framework 310, a financial/settlement/servicing services framework 311, an offers/advertisement services framework 312, a profile/preferences services framework 313, a VTS monitoring/control services framework 314, and/or a deceptive transaction services framework 316. Each of these frameworks will be described in turn.

Device framework 301 may provide low-level device services to client applications. Devices may be introduced and managed on the VTS using standards such as XFS and XFS/SNMP. In the context of the VTS, new devices and/or drivers may include Video codecs, Signature Pad device, Picture scanner device, and the like. All of these new devices that are to be managed by financial institution specific software may utilize XFS and XFS/SNMP compatibility. Multiple Clients and/or Agents may exist on the terminal, however the XFS Manager may be owned by the VTS Client but all XFS clients may register for all events regardless, to reduce or prevent collisions and manage device health appropriately as needed for each client.

Command/control framework 302 may support any or all of the monitoring and device control needed to perform remote diagnostics and control. A typical use case here may be, for example, an operator that needs to test a device remotely or recycle a device or entire machine. Although most of the components in this example framework 302 may be native SNMP implementations, there are vendor specific agents that may be additionally or alternatively used to implement such functions as software distribution and/or data mining. There may be interactions between this framework and the financial institution's VTS Client to provide synchronization and collaboration with each framework, for example, waiting for a transaction completion event before allowing recycle of the machine or device.

The framework 302 also provides interfaces that allow video agents the ability to send transaction level commands to VTS devices, to receive VTS application responses and/or VTS notification events, and to know the current status of the VTS or specific components of the VTS. The framework implements a Command and Control protocol that defines the permissible messages, sequence of messages and content of messages. Such a protocol may provide for the video agent to send commands to the VTS, and receive responses to those commands. Commands may include data required for the VTS to process the command. Responses may indicate success or failure of the command, additional action required by the video agent, error conditions, and may include additional data needed by the video agent to complete their tasks or to assist the customer. The protocol may also provide for the VTS to send messages to the video agent, to notify them about events or error conditions that arise during the processing of a customer transaction, and may include the current state of VTS components. The current state of VTS components may also be included in command responses.

The Command and Control protocol and associated messaging may be implemented in different ways, including queue-based messaging, point-to-point messaging, or through industry standard protocols such as Simple Network Management Protocol (SNMP).

The Command and Control framework 302 and the associated protocol may allow for a remote video agent to participate in the workflow of the VTS Client Framework. This capability provides for several unique features. For example, the framework 302 may provide for the video agent to control the VTS transaction processing sequence and screen presentation. The framework 302 may also advise the video agent that certain components are not useable and/or may advise the video agent that certain customer transactions are not available (due to failure of required components).

The framework 302 may advise the video agent of prior transactions performed by the customer during this VTS session, including any errors that may have occurred. The framework 302 may also allow for a video agent to intercede when a transaction might be declined, and provide additional information to enable the successful completion of the transaction. The framework 201 may convey digital images and/or associated data between the VTS and the video agent. The framework may allow the video agent to command the VTS to take certain actions if the customer is in distress—for example to record and save surveillance video.

When combined with other frameworks and/or services, the Command and Control framework 302 may support additional unique features. For example, framework 302 may communicate host messages and other conditions from the Transaction Framework 302 to the video agent so the agent can respond to conditions and potentially override suspected errors. In conjunction with an external Check Information service accessed through the Transaction Framework 302, may provide information to the video agent about the type of checks being negotiated, and may allow the agent to apply correct hold processing or check cashing treatment. The framework 302 may allow the video agent to perform enhanced authentication procedures based on recommendations from the Financial Service. In conjunction with the Contact Center Framework 304, the framework 302 may allow the video agent to transfer the customer session to another available agent. Through the framework 302, the video agent to notify the Device Framework 301 that a particular check should be rejected and returned to the customer. Framework 301 may also allow the video agent to request additional customer input through the VTS Client Framework 303. The framework 302 may also allow the video agent to exchange free-from messages with the customer through a display area and on-screen keyboard provided by the VTS Client Framework 303. This may be useful for hearing-impaired customers.

VTS client framework 303 may also provide all of the user interaction GUI as well as state machine and coordination with other frameworks, as previously described. Notable interactions here are various device and transaction interactions and any orchestration behaviors between the other frameworks. This may be the primary client component.

Contact center (CC) framework 304 may provide any or all of the features and functionality that enable interactive assistance with the customer. This may include, for instance, setting up a call with the next available agent in the network as well as any rendering functionality (e.g. video and/or audio). Contact center framework 304 may be responsible for servicing requests from the financial institution's VTS Client 303 as well as sending notifications to the financial institution's VTS Client framework 302 to enable proper state machine behavior. Contact center framework 304 may be responsible for managing connections with the appropriate agent and processing any command requests from the Contact Center Services 309 component within the financial institution's services framework 350, for example, an inbound request from an agent to activate the signature pad device for instance.

Check imaging framework 305 may be responsible for delivering check images and check metadata to the consolidation server (e.g., universal landing zone(s), or ULZ) 211. In addition, this framework is responsible for delivering enhanced resolution check images, picture images resulting from scanning, as well as signature images captured at the VTS and delivered to the VTS agent for inspection and transaction processing. The images may be delivered directly to the agent or may be saved on a storage device that may be accessed directly by the agent. In addition, these images may be accessed when the Customer session is transferred to another agent.

Transaction framework 306 may be responsible for sending and/or receiving financial transaction information between the VTS 101 and the financial institution's financial services. Transactions can have both a "Financial" and "Non-Financial" impact. Authorization and/or account lookup functions would be non-financial impactful, while a money transfer or deposit has financial impact. Vendor servicing transactions may also be handled in this framework domain, including VTS servicing and/or balancing. Transaction framework 306 may utilize various message formats (proprietary and/or web services) for completion.

Offers/advertising framework 307 may be responsible for implementing both "Offers Management" and/or "Advertising" requirements. Both Offers Management (i.e. OM) and Advertising services may work closely and coordinate with components within the financial institution's VTS client framework 303 (e.g., displaying the right advertisement and/or offer to the right customer at the right time). It may be the responsibility of this framework to maintain, collect and deliver the correct content, of current/new offers available and/or new advertisements that have been delivered through software distribution and/or via a real-time update.

Profile/preferences framework 308 may understand the context of a customer interaction and may be responsible for delivering content and/or capturing customer information used to enhance a customer's experience on VTS 101. These capabilities may include preference selections for languages, quick cash amount, receipt preferences, and/or other alert or eProfile services that may be offered in the Enterprise.

Contact center services framework 309 may allow a customer to interact with a financial institution contact center (CC) associate, such as via video and/or voice interactions initiated on VTS 101. Video agents may operate remotely from VTS 101 from a desktop configuration that may facilitate traditional call-center like functionality. These services may be responsible for routing contact center requests to the correct video agent and/or any orchestration of contact interaction including, for example, transferring calls from one video agent to another video agent.

Image processing services framework 310 may be responsible for capturing check image and check meta data. Any or all of the downstream check processing may also be part of image processing services framework 310.

Financial/settlement/servicing services framework 311 may manage any financial transactions, as well as any VTS settlement and/or servicing transaction sets. Some device status information may flow through this domain. Servicing-related transactions may also flow through this domain, such as service balancing type transactions, media maintenance, and electronic journal upload. Downstream deposit processing functionality may also be handled here. For example, ATM host 103 may send deposit information to other downstream systems.

Offers/advertisement services framework 312 may manage deployment and processing of offers and advertising requirements.

Profile/preferences services 313 may handle customer profile and preference processing. This channel may also process up-front PIN authentication.

VTS monitoring/control services framework 314 may include service components that allow monitoring and control of the VTS client applications and devices. This services domain may include, for example, various proprietary and/or licensed solution implementations. Each of these solutions may interact with VTS 101 in different ways.

Deceptive transaction framework 315 may handle business rules locally on VTS 101 as well as provide metadata used by deceptive transaction services framework 316.

Deceptive transaction services framework 316 may provide any or all VTS/debit deceptive transaction scoring services and/or interfaces to other enterprise deceptive transaction systems as needed or desired.

Figure 4:
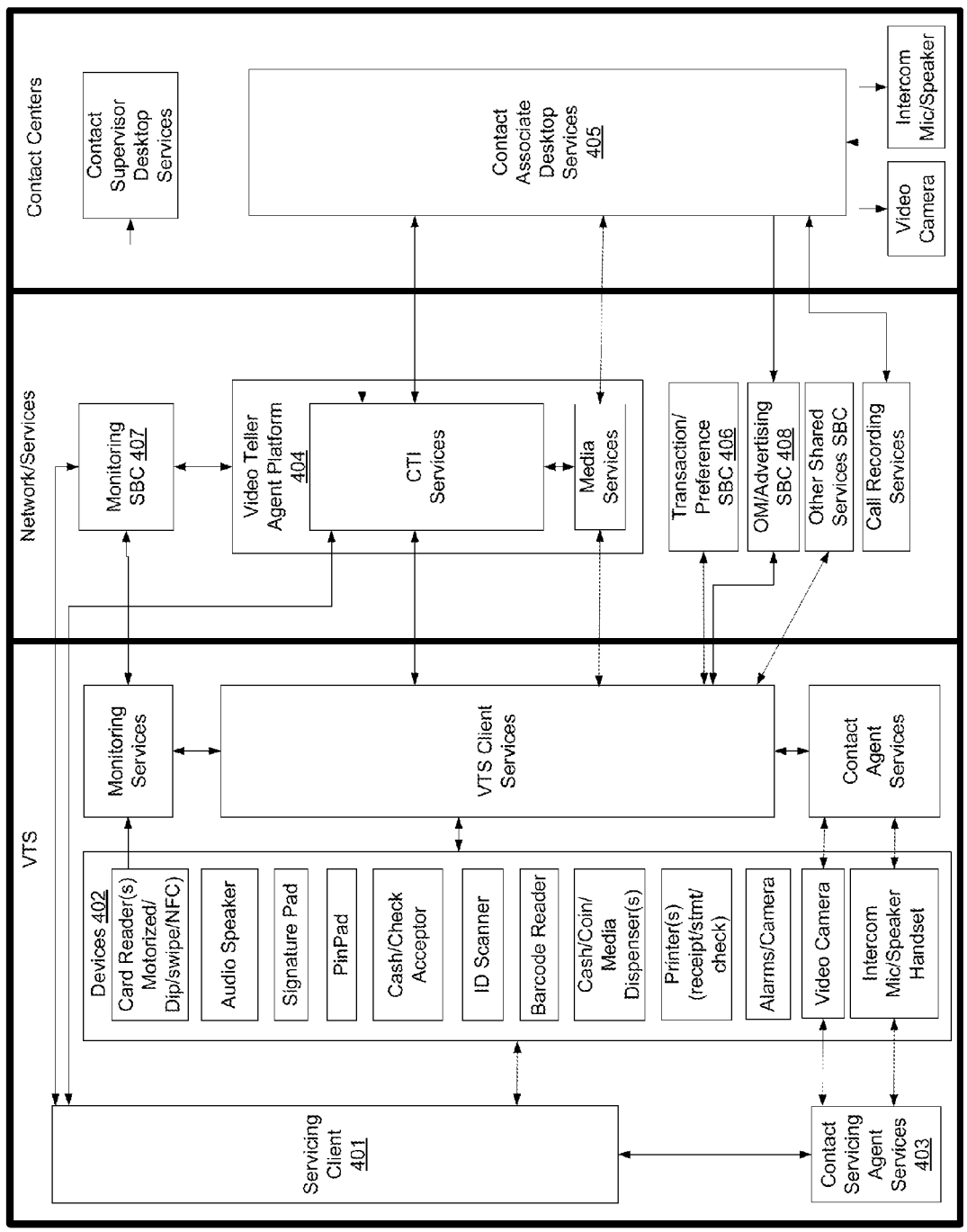
FIG. 4 is an example block component diagram of a VTS architecture definition.

FIG. 4 is an example block component diagram of a VTS architecture definition that may be implemented by the system of FIG. 1. The example architecture may include a servicing client 401, which may manage user interfaces (such as a GUI), device interaction, and/or external communications for VTS user and servicer sessions including CTI related functions.

The architecture may further include one or more video/audio devices 402, which may provide live video and/or audio services interaction between the VTS customer and the video agent. These may be separate devices (e.g., separate microphone and camera/display) or a compound integrated device. Examples of such devices may include one or more card readers, audio speakers, signature pads, PIN pads, cash/check/coin/media acceptors, ID scanners, barcode readers, alarms, cameras, card embossers, cash/coin/media dispensers, printers, microphones, and/or speakers. A signature pad may be used, e.g., for capturing a handwritten signature at the VTS for customer verification purposes during a video agent assisted transaction). An ID scanner may be used, e.g., for capturing identity card (e.g., driver's license, passport, and the like) information. The information may be captured in any manner desired, such as optically and/or magnetically, to verify the identity card information. The ID scanner may further include a bar code or quick-response code reader, to read any such codes that may be printed on the identity card.

The architecture may further include contact servicing agent services 403, which may be implemented as a VTS client software component responsible for managing video agent/customer interactions.

The architecture may further include a video teller agent platform 404, which may be implemented as, for example, a network environment may provide the connectivity and message protocol/routing (CTI Services) to allow CC video/voice communication between associate and customer as well as providing the necessary call transfer and routing functionality. Components within this platform may also be responsible for managing the video agent availability, connectivity and overall.

The architecture may further include contact associate desktop services 405, which may include components on the video agent's desktop that may be responsible for the interaction and/or fulfillment of the customer's transaction.

Figure 11:
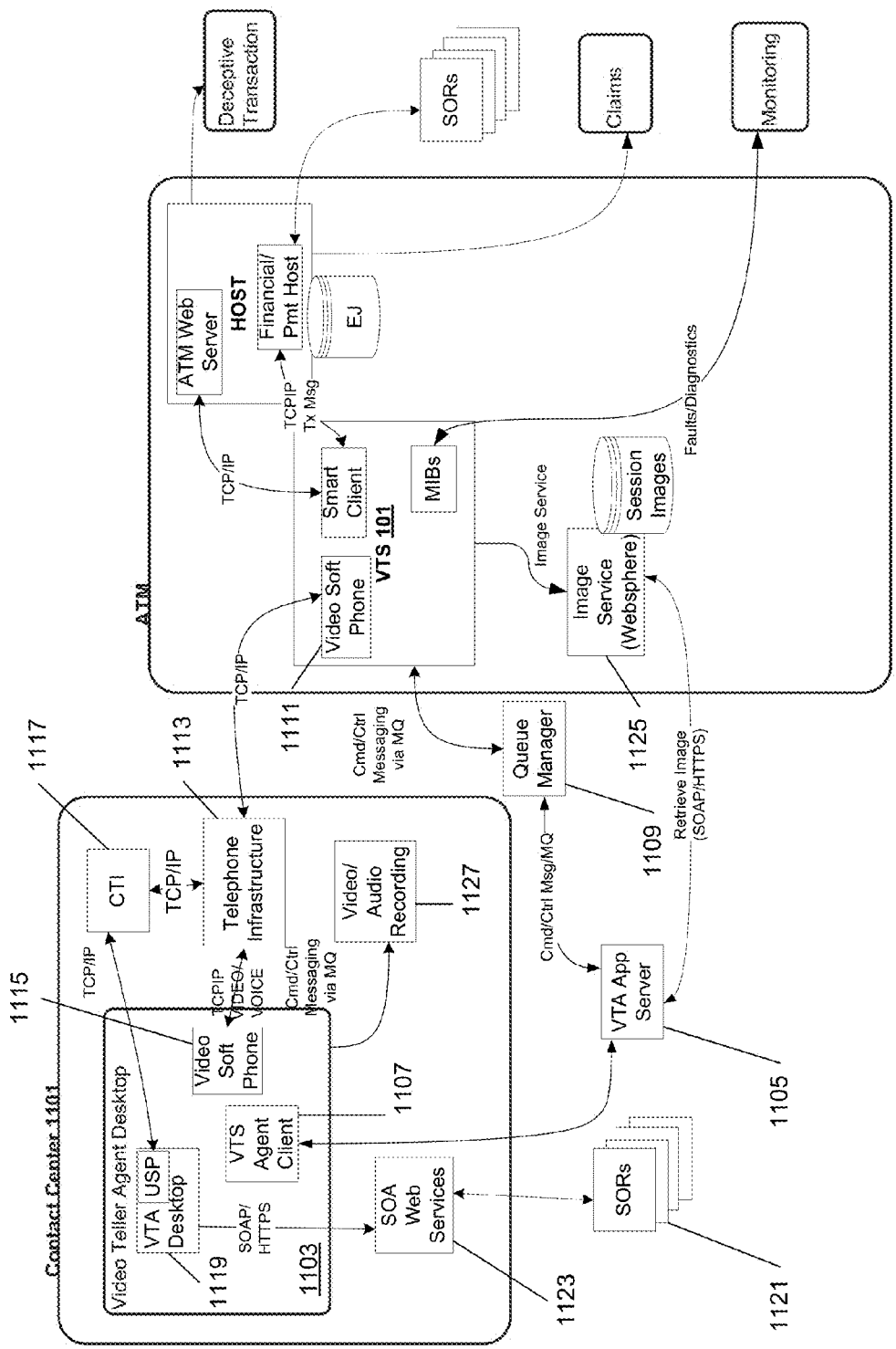
FIG. 11 is another block diagram of an example system environment in which VTS 101 may be situated.

FIG. 11 is a block diagram of an example system environment in which VTS 101 may be situated, including software, hardware, and/or firmware components for generating the video agent's desktop. A Video Teller Agent (VTA) application may enable bank associates operating in a Contact Center 1101 to provide personalized service to consumers using the bank's VTSs 101 via direct personal communications capabilities of videoconferencing. While the VTS 101 may support a consumer's end of an agent-to-consumer communications link, the VTA 1103 (which may be Video Agent Client 104 illustrated in FIG. 1) may manage the agent side of the service.

After accepting a notification from a Universal Soft Phone (USP), the VTA 1103 may establish a secure voice and video connection with the VTS 101 through the telephone infrastructure using video soft-phone control. The VTA 1103 may use the session identifier passed in a CTI notification message to connect with the specific VTS 101 that requested the video session. This request may be an explicit request originating with the customer or an automated request triggered by business rules in the VTS 101, such as in response to an error and/or in response to detecting customer distress.

The VTA 1103 and VTS 101 may communicate through a Command & Control messaging facilitated by a set of MQ-Series queues. Command & Control may allow the agent to send pre-scripted commands to the VTS 101 to start, stop, and authorize selected VTS transactions. In addition to sending commands to the VTS 101, the Command & Control messaging may also allow the VTS 101 to send back data about the customer and their transaction to the associate for review in a VTA browser window.

In some aspects, the video agent might not have full control of the VTS device 101. For example, the video agent might be given the ability to request predefined scripted actions such as: financial institution Customer Cash Check, Non-financial institution Customer Cash Check, Payment, Cash Advance, Withdraw, Deposit, Statement, Balance Inquiry, Transfer, and Custom Transactions, among others.

Additionally, the VTA 1103 may have access to enterprise level Web services through an Enterprise Integration Bus (EIB) to display check and customer signature images. These services may use SOAP over HTTPS protocols and mutual SSL authentication.

Several components that support the VTA application and the video teller agent are further identified in FIG. 11. The VTA App Server 1105 may be a web server that serves web pages over an HTTPS to a VTS agent client, such as a web browser 1107 running on the video teller agent's desktop. The VTA App Server 1105 may communicate with the VTS 101 through a Queue Manager 1109. The Queue Manager 1109 may be the hub of communication between the VTA App Server 1105 and the VTS 101.

The customer may use the VTS 101 and when a connection to a video agent is requested, the VTS 101 may use the Video Soft Phone 1111 to communicate with the Telephone Infrastructure 1113 to request connection to an agent. The Telephone infrastructure may connect the Video Soft Phone 1115 on the agent's desktop to the Video Soft Phone 1111 on the VTS 101. This may complete the video conference connection between the customer and the agent.

At the same time the video portion of the call is being established, the Telephone Infrastructure 1113 may use the CTI system 1117 to send data and call status messages to the USP. Through desktop integration, USP may communicate to the appropriate agent's Call Center App 1119 and the VTA App running in the web browser. The data sent to the USP may include the a VTS session identifier and customer identifiers that allow the agent's Call Center App to automatically retrieve the customer's profile and account data from the bank's systems of record 1121 through the SOA Web Services 1123. At the same time, the USP may send the session identification data through the VTA App to the VTA App Server 1105. This data may enable the VTA App Server 1105 to establish the Command and Control link through the Queue Manager 1109 to the VTS 101. The VTA App Server 1105 may also call the SOA Web Services 1123 to retrieve customer and account data needed to service the customer during the VTS session.

During the course of the session, images may be created by the VTS 101 and stored in the Image Service 1125. These images may include scans of the customer's ID and checks presented. The VTA App Server 1105 may retrieve these images from the Image Service 1125 for display to the agent through the VTA App running in the browser on the agent's desktop.

The agent's desktop applications may now have the customer's profile, and the session connections may be complete. The session may proceed through these connections, with the agent using the Call Center App and the VTA App as needed for servicing. Throughout the call, the Call Recording component 1127 may record the agent's desktop and the voice of the agent and the customer.

Returning to FIG. 4, the architecture may further include a financial institution transaction services (transaction/preference SBC) 406, which may be responsible for authenticating and/or processing customer transactions and/or for retrieving customer preferences.

The architecture may further include financial institution monitoring services 407, which may receive alternate information from applications and/or devices. These services 407 may have the ability to send commands to, and/or solicit information from, other devices and/or applications running on the VTS client.

The architecture may further include OM/advertising/preferences services 408, which may include enterprise systems that deliver common target advertisements to customers, or which may provide targeted advertising or other messages to customers based on their advertising preferences.

Figure 12:
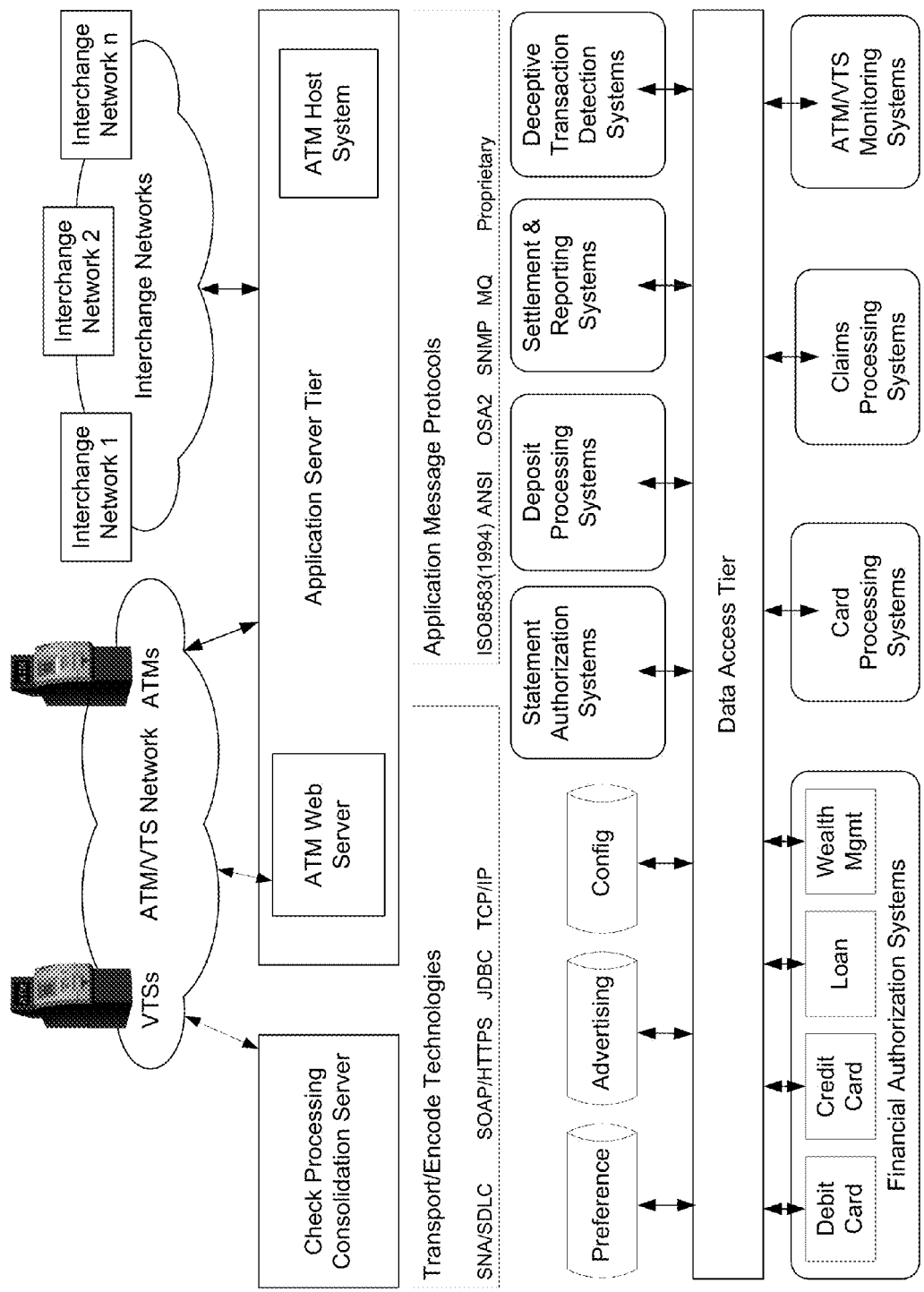
FIG. 12 is an example block diagram of an example VTS 101 system.

FIG. 12 is an example block diagram of an example VTS 101 system. As illustrated, VTSs 101 may operate on the same infrastructure and/or network as existing ATMs.

Figure 5:
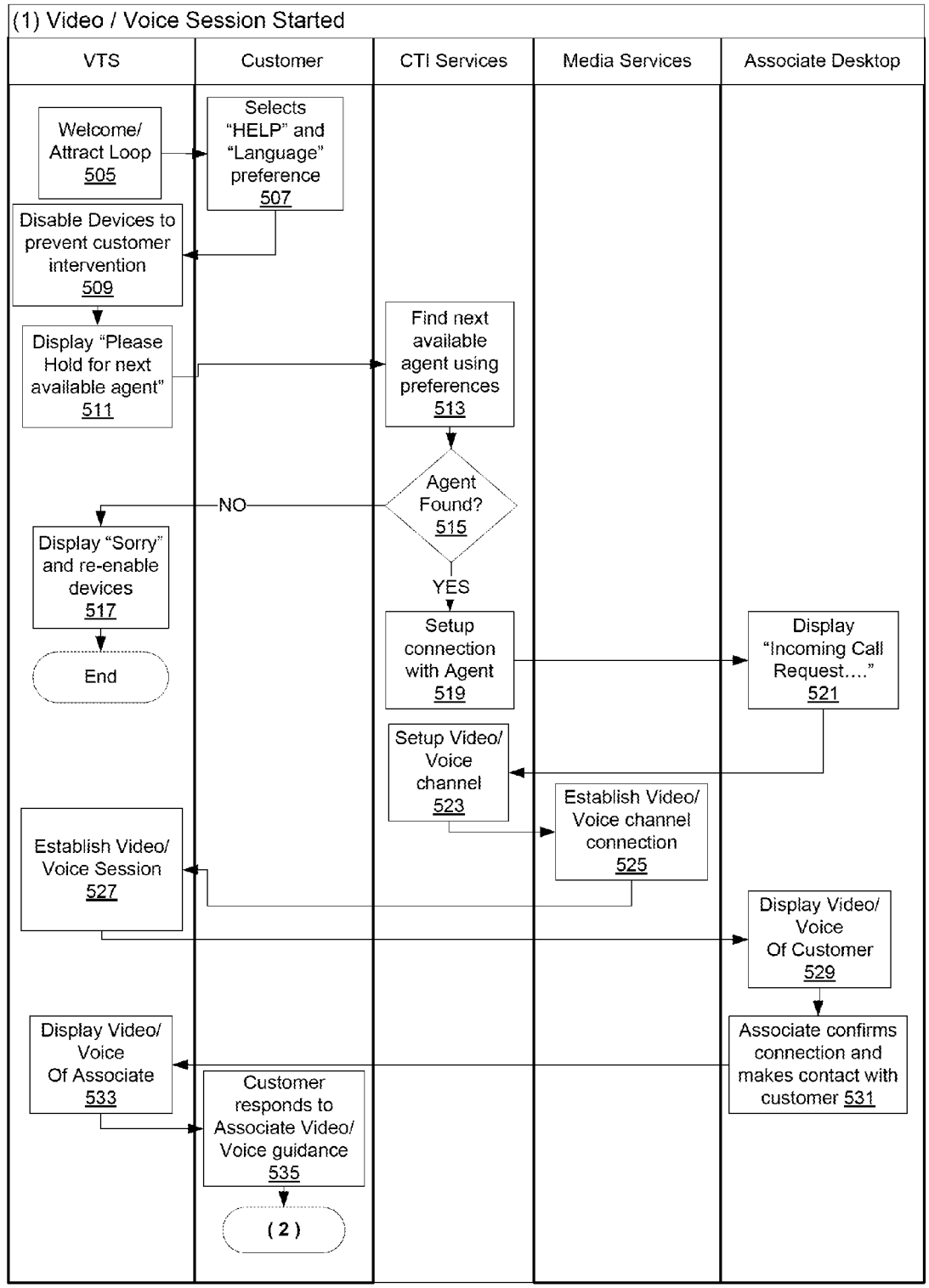
FIG. 5 is a flow chart of an example video/voice session initiation process.

FIG. 5 is a flow chart of an example video/voice session initiation process that may be performed by, e.g., the system of FIG. 1. In step 505, the VTS 101 may display a welcome or attract loop, such as advertisements or a welcome banner. In step 507, a customer may select help and/or language preferences at the VTS. In step 509, the VTS may disable various devices on the VTS to prevent customer intervention. In step 511, the VTS may display a "Please Hold for next available agent" message or a similar message. In step 513, a CTI service may find a next available agent using the customer's preferences. For example, the CTI service may attempt to locate a video agent that speaks the language indicated by the customer in step 507 and/or an agent that is trained to handle the type of error and/or transaction at the VTS 101. In step 515, the CTI service may determine whether an agent matching the user's transaction, language preference, and/or other preference has been found. If not, the VTS 101 may display a "Sorry" or similar message. The devices at the VTS 101 may be re-enabled for the user and/or other users to conduct transactions utilizing the VTS. If an agent has been found, the CTI service may setup a connection between the VTS and the agent in step 519. In step 521, an "Incoming Call Request . . . " or similar message may be displayed on the video agent's terminal. In step 523, the CTI service may set up video and/or voice channel(s) between the VTS and the agent's terminal. A video and/or voice channel connection may be established in step 525. In step 527, the VTS may agree to connect to the video agent via the established video and/or voice channels selected in steps 523 and 525. In step 529, a video and/or voice of the user may be displayed at the agent's terminal. The video agent may confirm a connection with the VTS/user and make contact with the user via the audio and video capabilities of the terminal and VTS. In step 533, the VTS may similarly display video and/or voice of the video agent. In step 535, the user may respond to the video agent's video and/or voice guidance (e.g., guidance to fix an error, complete a transaction using the VTS, provide additional transaction and/or customer information, and the like).

Figure 6:
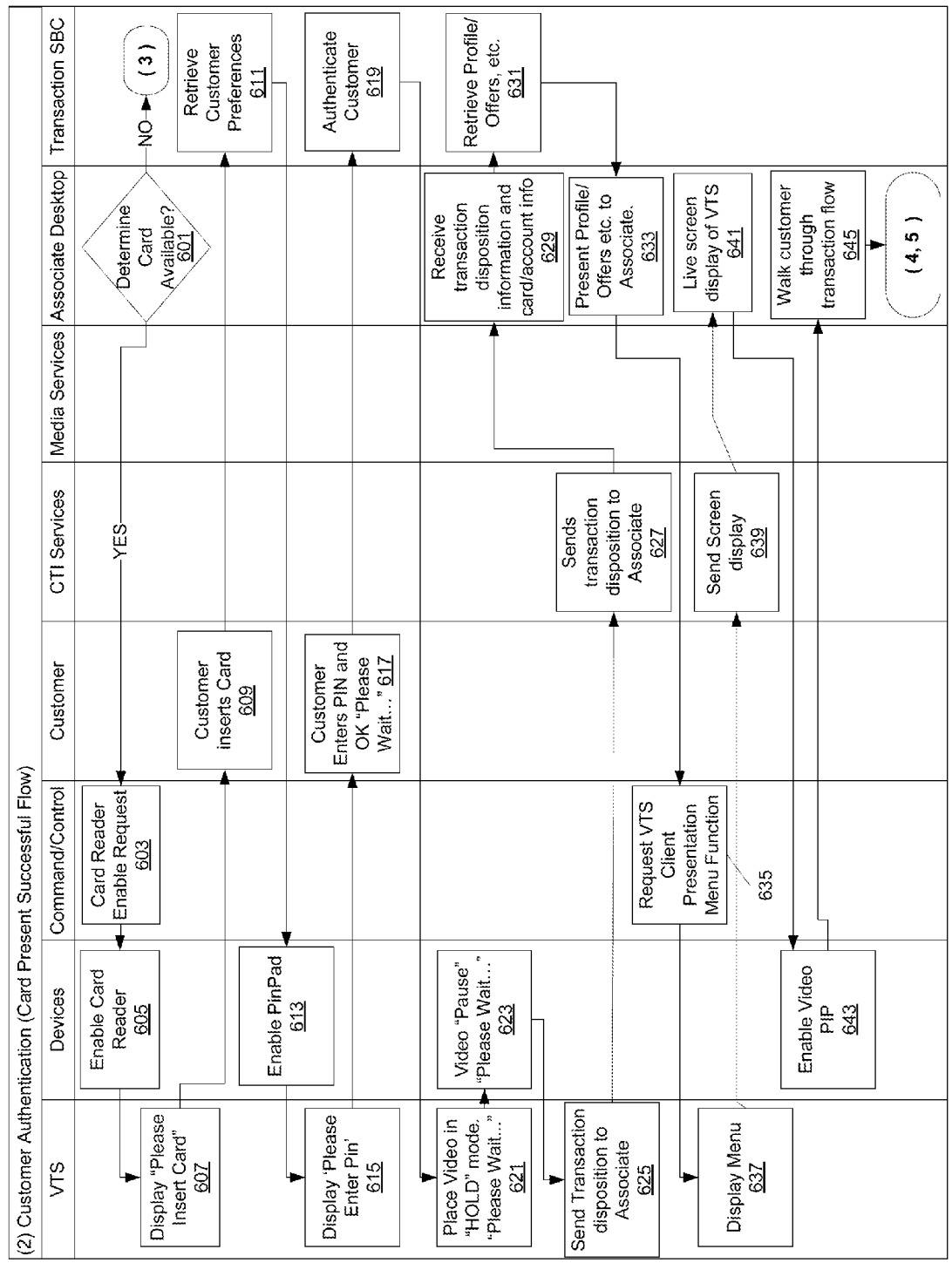
FIG. 6 is a flow chart of an example customer authentication process that may be performed when the customer's transaction card (e.g., bank transaction card) is present at the VTS.

FIG. 6 is a flow chart of an example customer authentication process that may be performed by, e.g., the system of FIG. 1, when the customer's transaction card (e.g., bank transaction card) is present at the VTS. In step 601, the video agent may determine whether the user at the VTS 101 has a card (e.g., bank card, debit card, and the like) available for authentication. If so, the video agent may enter a predefined request 603 through the agent's terminal to enable the card reader. The VTS card reader may be enabled in in step 605. In step 607, a "Please Insert Card" or similar message may be displayed to the user. In step 609, the user may insert a card. In step 611, the customer's preferences may be retrieved, which may be stored at a financial institution account associated with the user and/or information included in the card. In step 613, a pin pad device at the VTS 101 (physical or displayed on the VTS display) may be enabled. In step 615, the VTS may display a "Please Enter Pin" or similar message. In step 617, the user may enter a PIN and press OK or a similar button. The VTS may display a "Please Wait . . . " or similar message. The user may be authenticated in step 619. For example, the user's card information and/or PIN may be compared to stored card information and/or PIN. When the user is authenticated, the VTS may place the video in a hold mode and/or display a "Please wait . . . " or similar message. In step 623, a video device (e.g., a camera, display, and the like) may be paused. In step 625 and 627, the VTS and/or CTI service may send a transaction disposition to the video agent. In step 629, the video agent may receive the transaction disposition information and/or card/account information. In step 631, the transaction SBC may retrieve profile information, offers, and other information. In step 633, the video agent may be presented with the retrieved information. In step 635, the video agent may initiate a predefined request to the VTS to present a menu to the user. In step 637, the menu may be displayed at the VTS. In step 639, the same or substantially similar images displayed at the VTS may be sent to the video agent. In step 641, a live screen of the VTS may be displayed at the video agent's terminal. In step 643, a video picture-in-picture may be enabled at one or more VTS devices (e.g., a display). In step 645, the video agent may walk the customer through one or more transactions.

Figure 7:
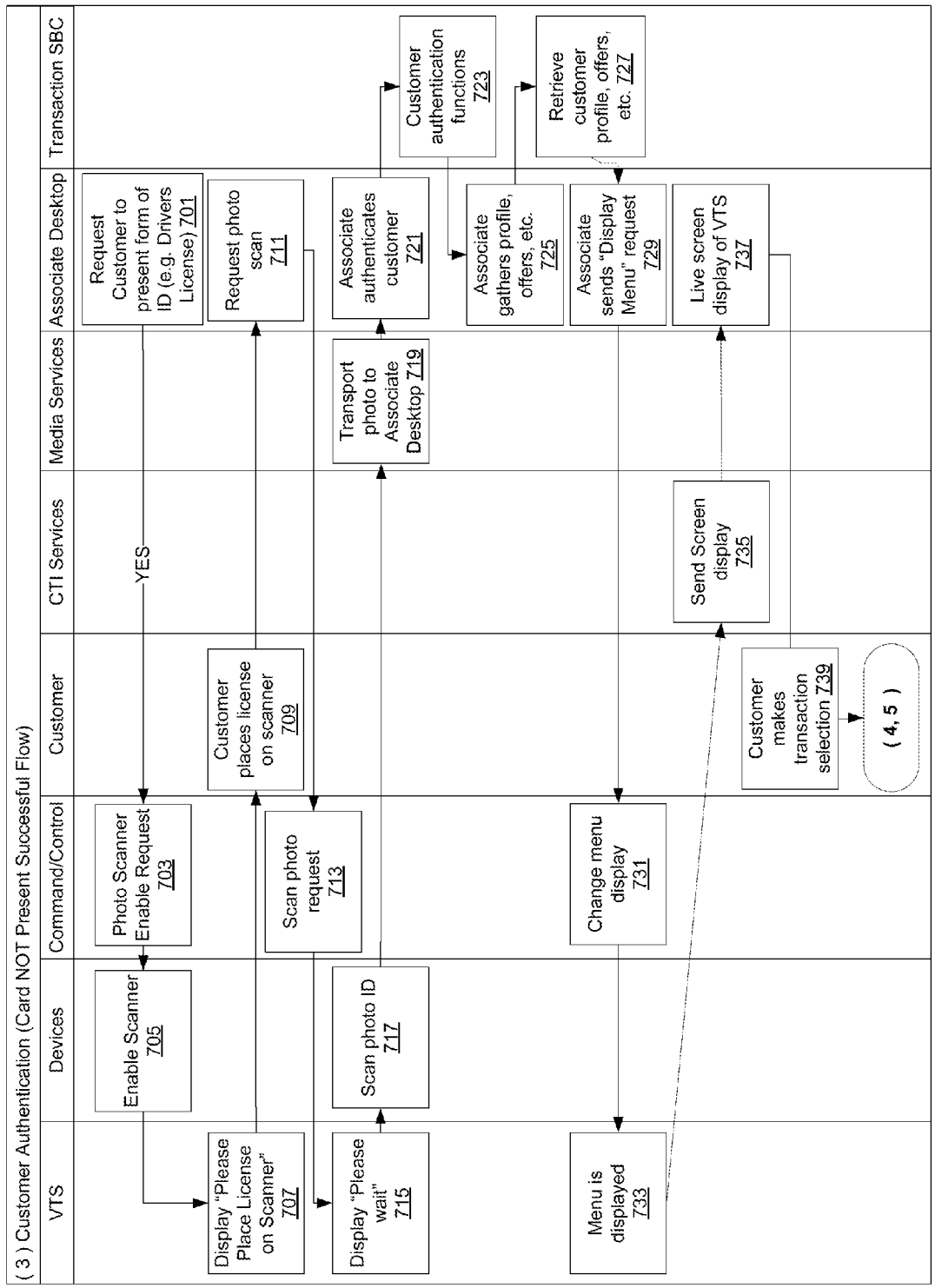
FIG. 7 is a flow chart of an example customer authentication process that may be performed when the customer's transaction card (e.g., bank transaction card) is not present at the VTS.

FIG. 7 is a flow chart of an example customer authentication process that may be performed by, e.g., the system of FIG. 1, when the customer's transaction card (e.g., bank transaction card) is not present at the VTS. In step 701, the video agent may request the user to present a form of identification, such as the user's driver's license or similar form of identification having an image identifying the user. In step 703, a request for the VTS to enable a scanner may be transmitted, and the scanner may be enabled in step 705. In step 707, the VTS may display a "Please Place License on Scanner" or similar message to the user. In step 709, the user may place a license or other identification on the scanner. In step 711, the video agent may request a photo scan of the identification. In step 713, a scan photo request may be transmitted to the VTS. In step 715, a "Please Wait" or similar message may be displayed to the user. In step 717, the scanner may scan the user's photo ID. In step 719, the scanned photo may be transmitted to the video agent from the media service. In step 721, the video agent may authenticate the user. For example, the video agent may compare the transmitted image of the user's ID to the user at the VTS and/or an image of the user stored in the user's profile with the financial institution, such as when the user is a customer of the financial institution. In step 723, the transaction SBC may perform various customer authentication functions. In step 725, the video agent may gather profile information, offer information, and the like from a database. In step 727, the transaction SBC may retrieve the customer profile information, offer information, and the like. In step 729, the video agent may transmit a request to the VTS to display a menu. The request may be forwarded through command/control in step 731, and the menu may be displayed at the VTS in step 733. In step 735, a CTI service may send the screen/menu displayed at the VTS to the video agent terminal. In step 737, a live screen of the menu/screen of the VTS may be displayed on the video agent's terminal. In step 739, the customer may select a transaction to perform, after the foregoing authentication steps.

Figure 8:
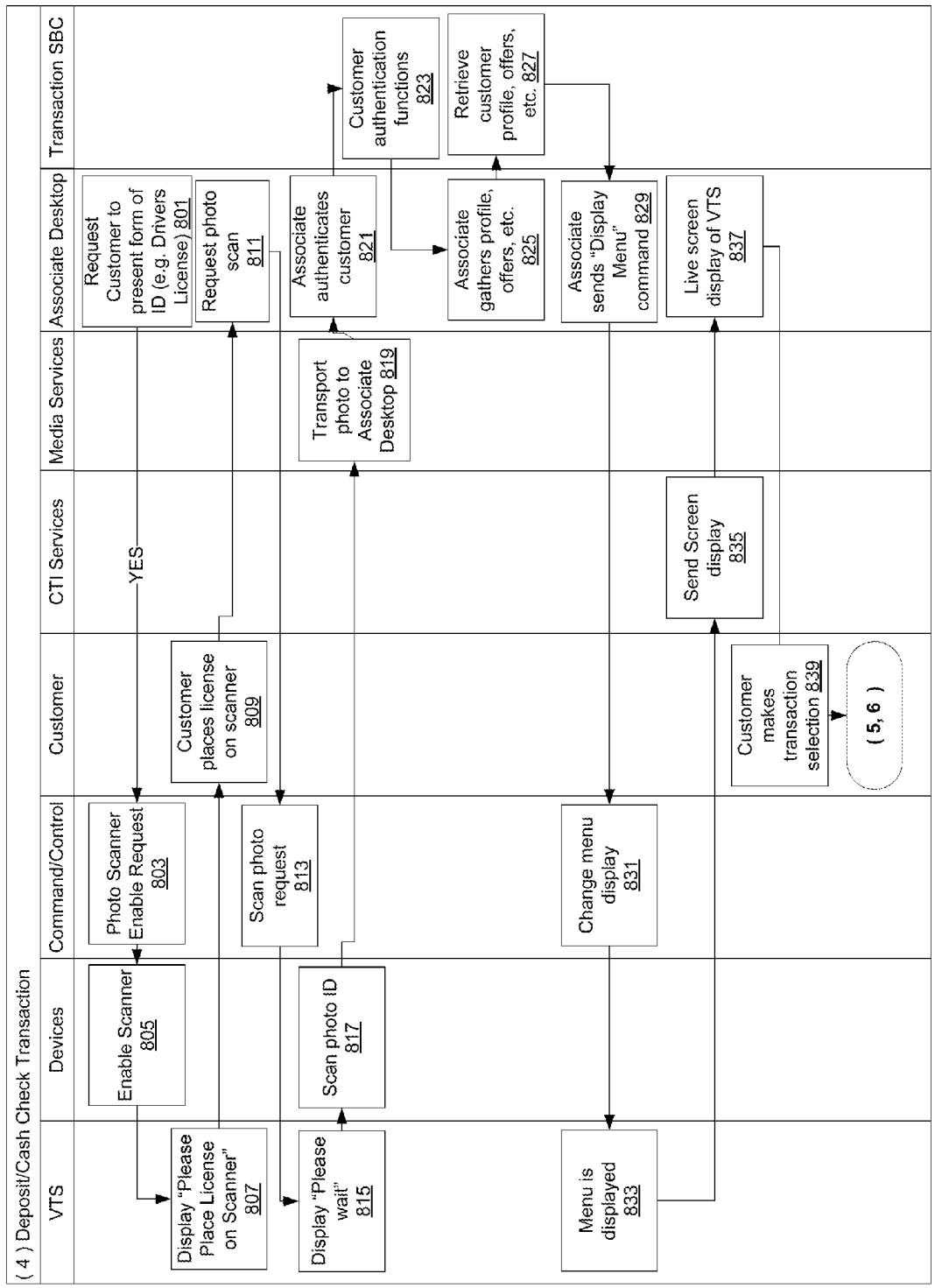
FIG. 8 is a flow chart of an example deposit/cash/check process that may be performed upon customer authentication.

FIG. 8 is a flow chart of an example deposit/cash/check process that may be performed by, e.g., the system of FIG. 1, upon customer authentication. Various components, such as the VTS, Devices, Command/Control, and other devices illustrated in FIG. 8, may perform steps 801-839, as previously described with respect to FIG. 7.

Figure 9:
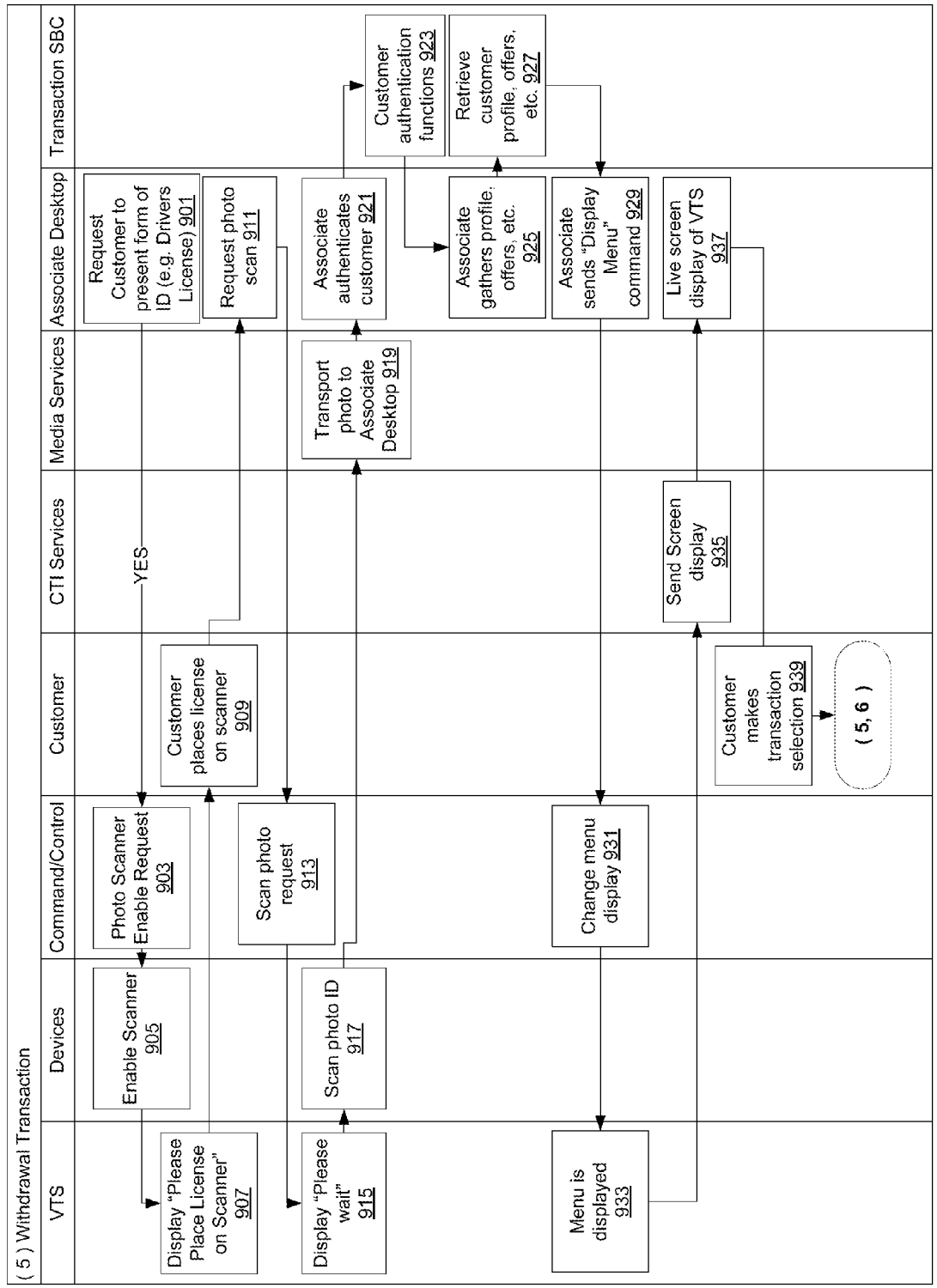
FIG. 9 is a flow chart of an example withdrawal transaction process.

FIG. 9 is a flow chart of an example withdrawal transaction process that may be performed by, e.g., the system of FIG. 1. Various components, such as the VTS, Devices, Command/ Control, and other devices illustrated in FIG. 9, may perform steps 901-939, as previously described with respect to FIG. 7.

Figure 10:
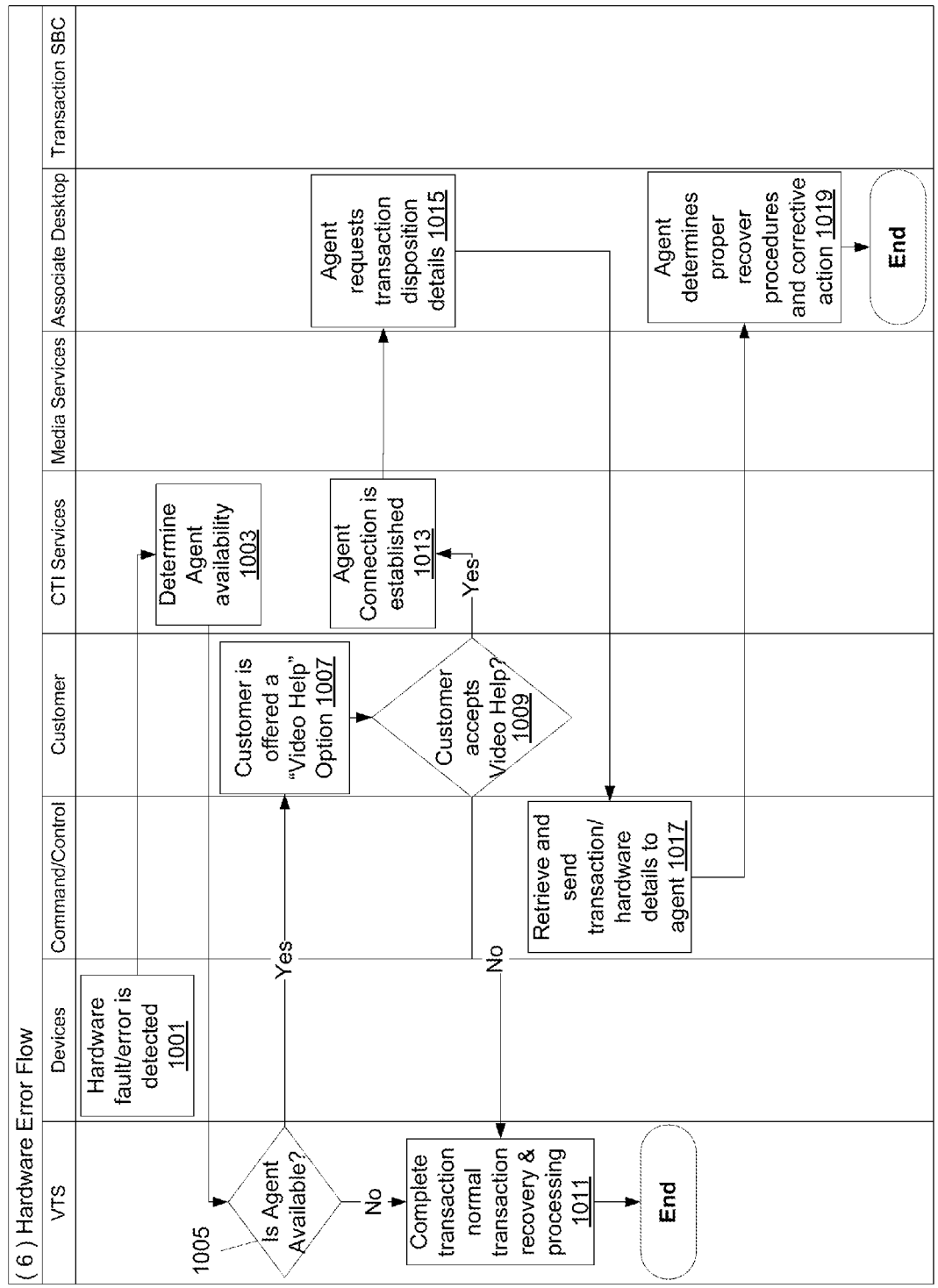
FIG. 10 is a flow chart of an example hardware error flow.

FIG. 10 is a flow chart of an example hardware error flow that may be performed by, e.g., the system of FIG. 1. This particular example involves a customer that is currently in the middle of a self-service transaction (e.g., a check deposit), and the check receiving device jams during accepting the check. In this scenario, there is an option that is displayed to the customer for online (video assistance) help from a video agent with the transaction failure. In step 1001, the VTS 101 and/or devices included therein (e.g., card reader, cash dispenser, scanner, and the like) may detect that an error, such as a hardware error has occurred. The VTS 101 may transmit a message to the CTI service indicating an error, and the CTI service, in step 1003, may determine whether an agent is available to address the error specified in the transmission. Agents may be categorized based on specialty and/or training. For example, a first agent may be trained to resolve check jam errors. A second agent, on the other hand, might not be trained to resolve check jam errors. Instead, the second agent may specialize in resolving funds withdrawal errors. Thus, the first agent may be available to address the user's check jam error, and the second agent may be available to address funds withdrawal errors. An agent may be categorized in more than one group. For example, a third agent may be trained to resolve check jam errors and funds withdrawals errors. Each agent may have a profile, and the agent's categorization(s) may be stored in the profile. Determining agent availability may include retrieving a video agent's profile, comparing the detected error to the video agent's profile information, and determining whether the agent is categorized to handle the detected error.

Agent availability may also depend on the wait time for an available agent, as previously described. Wait time may include an approximate time that the user might wait until an agent (categorized to handle the error) becomes available. The CTI service may determine that an agent (or group of agents, such as a group categorized to handle a particular error) is unavailable if the wait time exceeds a predetermined threshold time. If no agent is available, the VTS may print an error receipt that includes information identifying the error, such as an error code, an error time, a telephone number to call to resolve the error, and the like, as described, for example, below with respect to step 1705. In step 1005, the CTI service may transmit a message to VTS 101 indicating whether an agent is available. If an agent is available (e.g., the wait time does not exceed the predetermined threshold time and/or an agent categorized to handle the error is located), the user may be offered a "video help" or similar option in step 1007. In step 1009, the VTS may determine whether the user has accepted the video help option (e.g., by pressing yes or otherwise indicating a desire for video help). If the user has not indicated a desire for video help, the VTS may complete standard transaction error recovery and processing in step 1011 without the help of a video agent. As previously described, an error receipt may also be printed. If the user has indicated a desire for video help, the CTI service may establish a connection to the agent in step 1013 when the agent becomes available. In step 1015, the agent may request, through the agent's terminal, details on the transaction and/or error. In step 1017, the agent may retrieve the transaction, error, and/or hardware details via a request to the VTS. Alternatively, information describing the transaction, error, and/or hardware may automatically be forwarded by the VTS to the agent. In step 1019, the agent may determine the proper recovery procedures and/or corrective action based on the received information.

Figure 13:
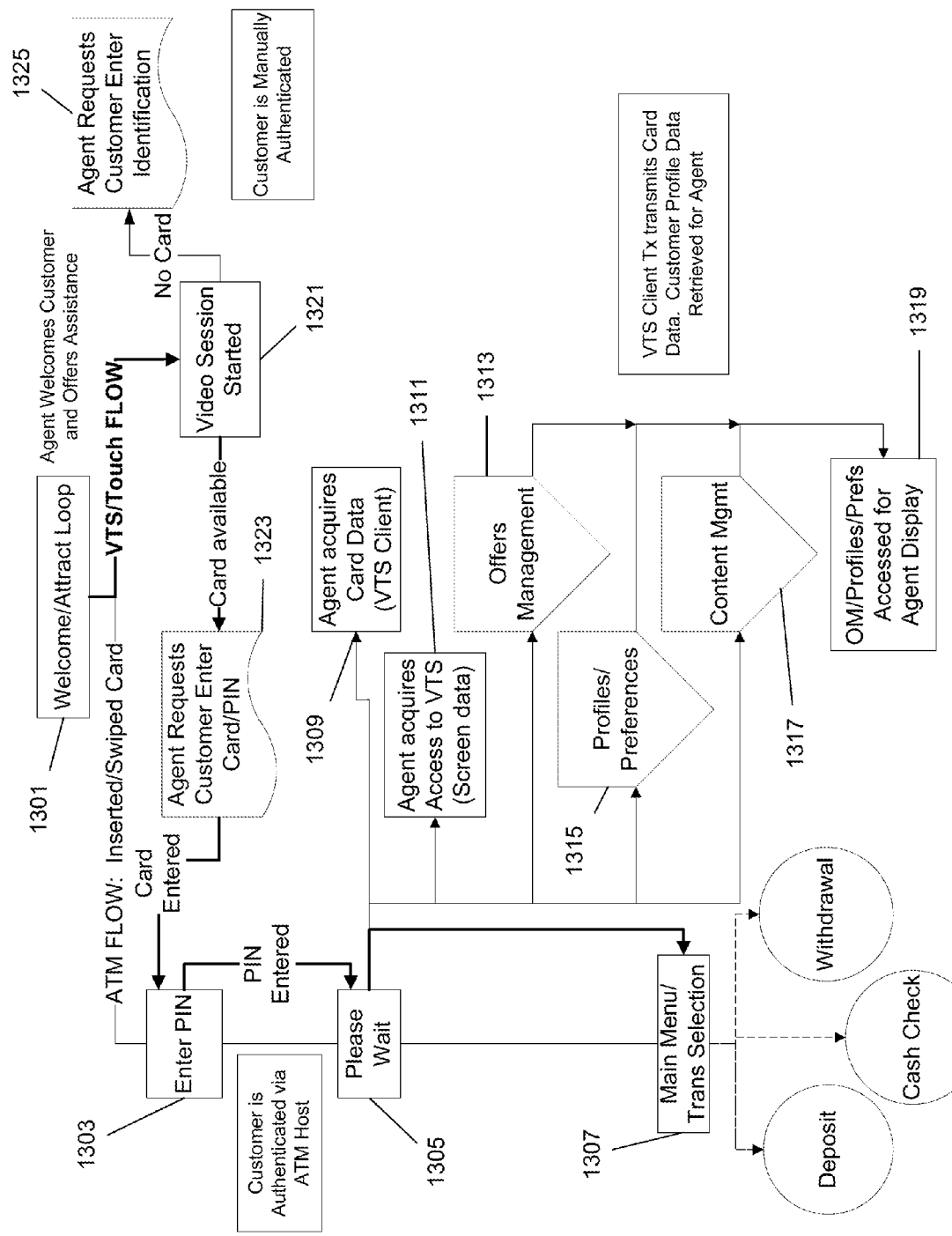
FIG. 13 is a flow chart of an example customer welcome flow.

FIG. 13 is a flow chart of an example customer welcome flow that may be implemented by a VTS, such as VTS 101. These steps may be performed by a computing device, such as a device at the VTS 101 and/or an external server. In step 1301, the computing device may initiate a welcome loop or a loop to attract business. For example, the computing device may retrieve content, such as advertisements, and display the content on the VTS 101. A user using VTS 101 may initiate an ATM flow or a VTS flow. For example, the user may initiate the ATM flow by inserting and/or swiping a card, such as a debit card, bank card, and the like. In step 1303, the VTS 101 may request the user to enter a PIN. In step 1305, the computing device may wait to authenticate the user. Authentication may occur automatically via an ATM Host (and without video agent intervention). When the user is authenticated, the computing device, in step 1307, may generate a main menu that permits the user to select a transaction to complete, such as a deposit, cashing a check, a withdrawal, and/or any other transaction described herein.

After the user enters his or her PIN, the computing device may simultaneously transmit the entered information to a video agent in step 1309. In step 1311, the video agent may acquire access to the VTS 101, such as the ability to retrieve screen data from the VTS 101. The video agent and/or VTS 101 may also retrieve additional information from one or more databases, such as an offers management database 1313, a profiles/preferences database 1315, a content management database 1317, and the like. The retrieved information may be displayed at the video agent's terminal, as illustrated in step 1319.

The user may enter the VTS flow (instead of the ATM flow), such as by pressing a video agent assistance button on a display at the VTS 101. A video session with an agent may also be automatically triggered 1321 when a user interacts with the VTS 101. During the session, the user may indicate whether the user has a card. If the user has a card, the video agent may request, through the VTS, the user to enter a card and/or PIN information in step 1323. The flow may proceed to step 1303 as previously described. If the user does not have a card, the video agent may request the user to provide identification information. For example, as previously described, the user may provide information from a driver's license (by scanning or manual input). Alternatively, the a camera at the VTS 101 may capture an image of the user and transmit the image to the video agent. In some aspects, the video agent may manually authenticate the user based on the received information. The video agent may transmit a request to the VTS to permit the user conduct transactions at the VTS if the user is authenticated.

Figure 14:
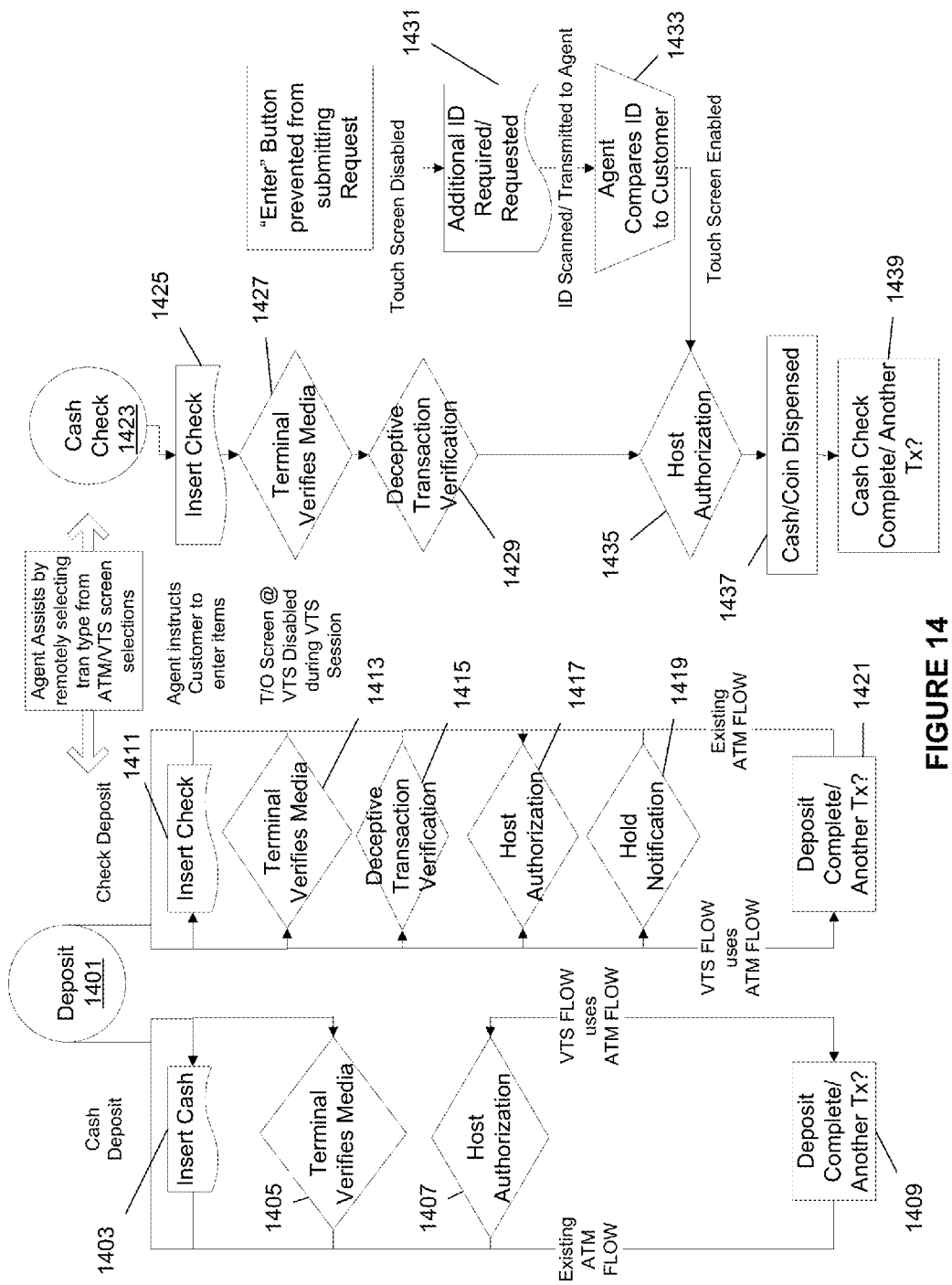
FIG. 14 is a flow chart of an example deposit cash/check flow.

FIG. 14 is a flow chart of an example deposit cash/check flow that may be implemented by a VTS, such as VTS 101. A video agent may assist a user by remotely selecting, from the agent's terminal, the type of transaction to complete for the user, such as a deposit 1401 or cashing a check 1423. In some aspects, the video agent may select the transaction type from the types displayed to the user at the ATM/VTS. Thus, the user may follow along with the video agent as the agent makes selections on behalf of the user.

Deposit 1401 may be, for example, a cash deposit or check deposit. For a cash deposit, the user may insert cash into the VTS at step 1403. The VTS may verify the media in step 1405, such as by verifying the authenticity and/or amount of cash entered. In step 1407, an ATM Host, such as Host 103, may authorize the deposit transaction. In step 1409, the VTS may prompt the user to indicate whether the user would like to conduct another transaction with the VTS.

For a check deposit, the user may insert a check into the VTS at step 1411. In step 1413, the VTS may verify the media, such as by verifying the authenticity and/or amount of the check entered. In step 1415, the ATM Host may check for potential deceptive transactions (e.g., utilizing predetermined business rules and/or based on the user's profile with the financial institution). In step 1417, the ATM Host may authorize the deposit transaction. In step 1419, the ATM Host and/or VTS may present a hold notification to the user for acceptance. In step 1421, the VTS may prompt the user to indicate whether the user would like to conduct another transaction with the VTS.

The video agent may also select a cash check transaction 1423 for the user. In step 1425, the user may insert the check. In step 1427, the VTS may verify the media, such as by verifying the authenticity and/or amount of the check entered. In step 1429, deceptive transaction verification may be performed by the ATM Host (e.g., utilizing predetermined business rules and/or based on the user's profile with the financial institution). If a potential deceptive transaction condition exists, the touch screen of the VTS may be disabled. In step 1431, additional identification may be required and/or requested from the user. The user may provide any form of identification, including a PIN, account number, card number, a driver's license photo, and the like. The VTS may also capture an image of the user as the additional form if identification. After the VTS receives the identification (e.g., by user input or scanning by the VTS). The identification may be transmitted to the agent. In step 1433, the agent may compare the identification to the user. For example, the agent may compare an image from the user's driver's license to an image of the user displayed on the agent's terminal. If the agent authenticates the user, the VTS touch screen may be enabled, and the ATM Host may authorize the transaction in step 1435. In step 1437, the requested cash, coins, or other monetary media may be dispensed to the user. In step 1439, the VTS may prompt the user to indicate whether the user would like to conduct another transaction with the VTS.

Figure 15:
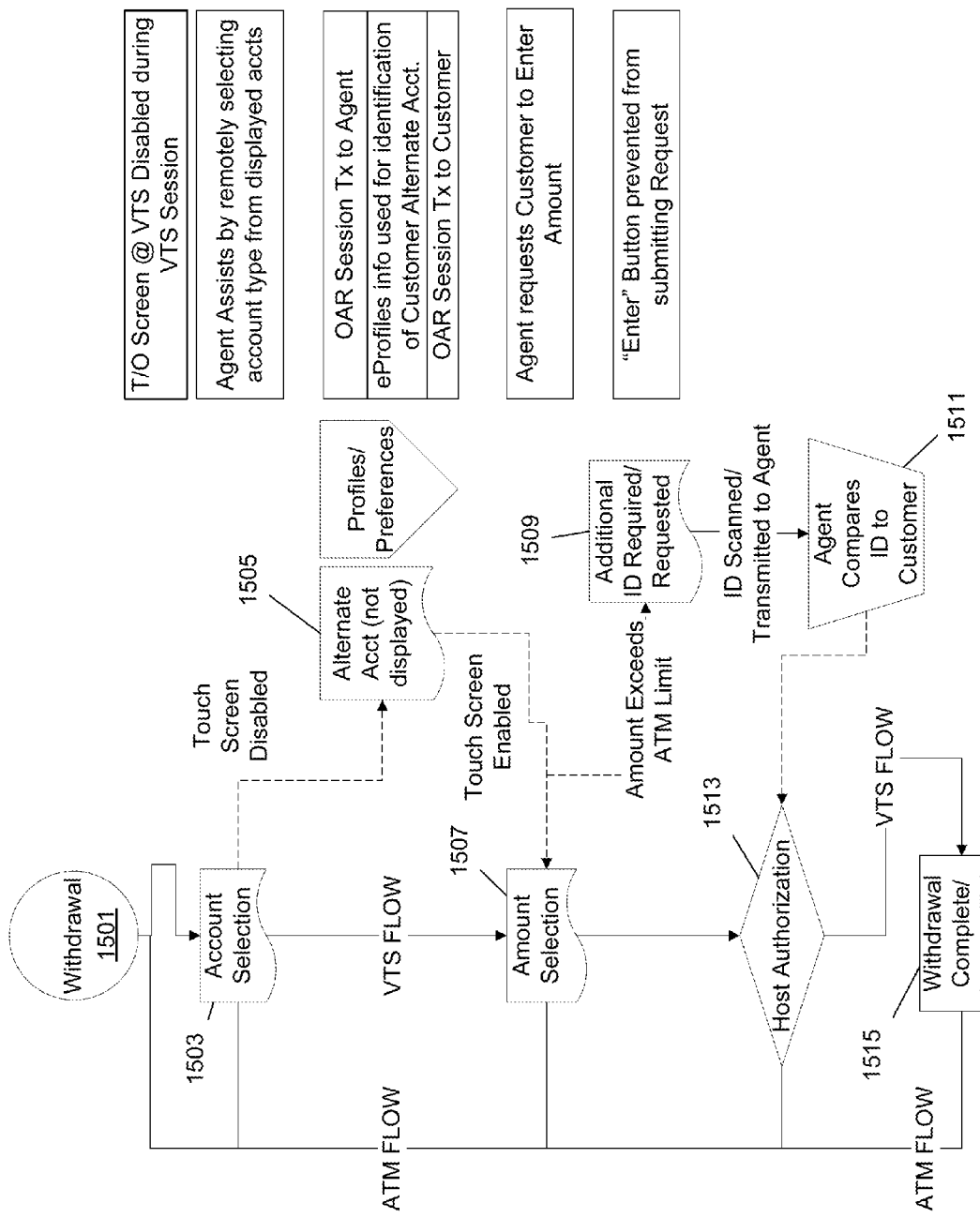
FIG. 15 is a flow chart of an example cash withdrawal flow.

FIG. 15 is a flow chart of an example cash withdrawal 1501 flow that may be implemented by a VTS, such as VTS 101. At the VTS 101, the user may select an account to withdraw funds from. If the desired account is not displayed, the touch screen may be disabled, and an agent, in step 1505, may assist the user to select an alternate account. For example, the agent may access the user's profile and/or preferences to identify alternate accounts. When a desired account is located, the user may withdraw from the desired account. The VTS touch screen may be enabled, and information on the located account may be displayed on the touch screen. In step 1507, the user may select an amount of funds to withdraw. The amount of funds requested may exceed a VTS limit. For example, the VTS may be programmed with a predetermined limit for all users (e.g., maximum $500 withdrawal for any customer that uses the VTS) and/or a predetermined limit for each user (e.g., a different maximum withdrawal for each user based on the type of account for the user, the user's history, results of predefined deceptive checks, and the like). If the requested withdrawal amount exceeds the VTS limit, additional identification may be required and/or requested from the user in step 1509. The user may provide any form of identification, including a PIN, account number, card number, a driver's license photo, and the like. The VTS may also capture an image of the user as the additional form if identification. After the VTS receives the identification (e.g., by user input or scanning by the VTS). The identification may be transmitted to the agent. In step 1511, the agent may compare the identification to the user. For example, the agent may compare an image from the user's driver's license to an image of the user displayed on the agent's terminal. If the agent authenticates the user, the ATM Host 103 may authorize the transaction in step 1513. In step 1515, the VTS 101 may prompt the user to indicate whether the user would like to conduct another transaction with the VTS.

FIG. 15 is a flow chart of an example cash withdrawal 1501 flow that may be implemented by a VTS, such as VTS 101. At the VTS 101, the user may select an account to withdraw funds from. If the desired account is not displayed, the touch screen may be disabled, and an agent, in step 1505, may assist the user to select an alternate account. For example, the agent may access the user's profile and/or preferences to identify alternate accounts. When a desired account is located, the user may withdraw from the desired account. The VTS touch screen may be enabled, and information on the located account may be displayed on the touch screen. In step 1507, the user may select an amount of funds to withdraw. The amount of funds requested may exceed a VTS limit. For example, the VTS may be programmed with a predetermined limit for all users (e.g., maximum $500 withdrawal for any customer that uses the VTS) and/or a predetermined limit for each user (e.g., a different maximum withdrawal for each user based on the type of account for the user, the user's history, results of predefined fraud checks, and the like). If the requested withdrawal amount exceeds the VTS limit, additional identification may be required and/or requested from the user in step 1509. The user may provide any form of identification, including a PIN, account number, card number, a driver's license photo, and the like. The VTS may also capture an image of the user as the additional form if identification. After the VTS receives the identification (e.g., by user input or scanning by the VTS). The identification may be transmitted to the agent. In step 1511, the agent may compare the identification to the user. For example, the agent may compare an image from the user's driver's license to an image of the user displayed on the agent's terminal. If the agent authenticates the user, the ATM Host 103 may authorize the transaction in step 1513. In step 1515, the VTS 101 may prompt the user to indicate whether the user would like to conduct another transaction with the VTS.

Figure 16:
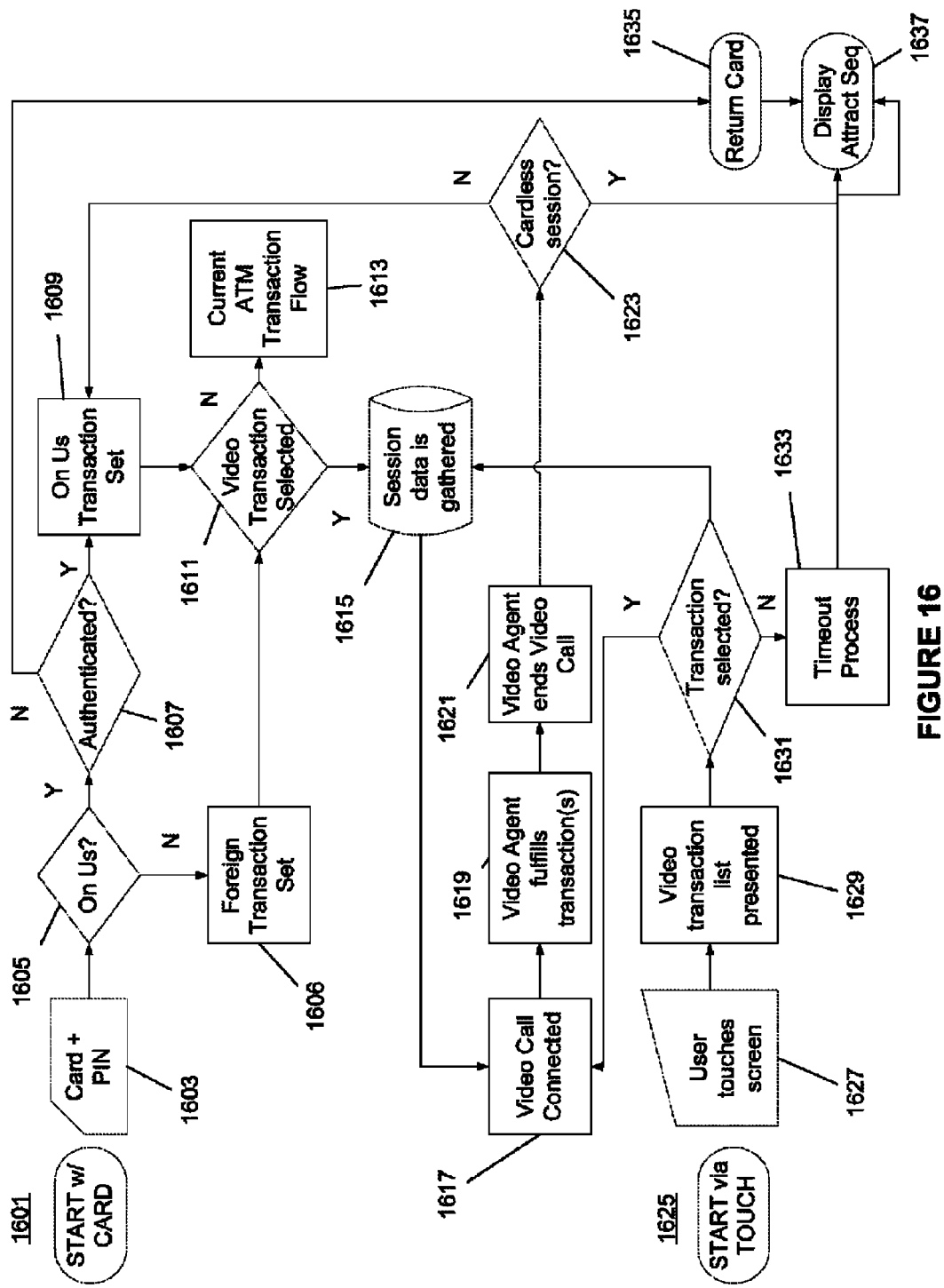
FIG. 16 is a flow chart of an example video-enabled VTS transaction business process flow.

FIG. 16 is a flow chart of an example video-enabled VTS transaction business process flow that may be performed by the system of FIG. 1. If video is available at the VTS, a "start" button may be presented on the attract screen of the VTS 1625. Video enabled transactions may also appear on the main On-Us transaction menu when video is available. Transactions at the VTS may be initiated as cardless transactions or as card-plus-PIN transactions 1601.

Moreover, multi-lingual video agents may be made available. For a cardless session, the VTS customer/user may have the ability to select their desired language, and then may be routed to a video agent that may conduct the video session in the selected language. For a card-based transaction, if a language preference for ATM utilization has already been set in association with that card (via the preference database), the VTS may use that predetermined preference from the preference database as the default language for the video agent and route accordingly. If a preference has not yet been set, the customer may select the language in the same fashion as the card-less transaction.

The video agent may be able to assist the customer with performing various transactions, such as but not limited to Balance Inquiry; Cash Withdrawal; Credit Card cash advance; Deposit; Transfer; Payments; Full Statement; and Mini Statement. Additionally, the following transactions, for example, shown in Table 3 below may be supported due to the presence of video capabilities at the VTS. The list in Table 3 is merely illustrative and should not be construed as exhaustive. Moreover, the video agent may have access to additional applications for data elements to help the video agent approve transactions, such as posted information; account/profile details; signature cards, and the like.

TABLE 3

| | |
|---|---|
| Check Cashing | On-Us item—Customer and Non Customer<br>Off-Us item—Customer only |
| Split Deposit | Customer presenting an item for deposit and desiring the funds to be deposited into multiple accounts |
| Deposit Less Cash | Customer presenting an item for deposit and desiring to deposit some of the funds as well as take cash from the item |
| Issue Official Check | Proceeds to fund the official check could come from, e.g., DDA accounts, card advance, cash or check |
| Issue Money Order | Proceeds to fund the official check could come from, e.g., DDA accounts, card advance, cash or check |
| Payments | Payments to multiple types of accounts |

To better provide the customer with a consistent experience as compared to a live teller transaction, should a hold notification be presented to the video agent for any item being deposited, the video agent may have the ability to cause the VTS to return the item to the customer upon request by the customer.

Moreover, should video be available at the VTS and an error condition occurs, the VTS may present a displayed button, for example, on the screen allowing the customer to connect to a video agent for help. For the purpose of illustrating the use case, assume that a customer is performing a check deposit in a fully automated fashion, and the check acceptor jams, leaving the customer with the uncertainty of what to do next. In this case, a video agent may be summoned by the customer by selecting this option at the VTS (or the video agent may appear automatically).

In a card transaction 1601, a user may insert the card and an associated PIN in step 1603. In step 1605, the VTS 101 may determine whether the transaction is on us. In on us transactions, the card being utilized by the user may be provided (e.g., issued) by the financial institution. Accounts linked to the card may be associated with the financial institution. In off-us transactions (e.g., foreign transaction set 1606) the card being utilized by the user may be provided (e.g., issued) by an entity different from the financial institution, such as a different financial institution. Accounts linked to the card may be associated with the different financial institution. If the transaction is on us, the VTS may attempt to authenticate the user based on the card and/or PIN provided by the user in step 1607. The VTS may return the user's card in step 1635. If the user is authenticated, the VTS may permit the user to conduct a predetermined on us transaction set 1609. In step 1611, the VTS may determine whether the user has selected a video transaction option. Furthermore, some transactions may be categorized as video transactions. If video transaction has not been selected (step 1611: N), the VTS, in step 1613, may perform a transaction using a current ATM transaction flow (e.g., without the services of a video agent). If video transaction has been selected (step 1611: Y), session data, including user information, transaction information, and the like, may be gathered and transmitted to a video agent terminal in step 1615. In step 1617, a video call may be connected between the VTS and an agent terminal. The video agent may fulfill the requested transactions in step 1619. For example, the video agent may utilize the video connection to interact with the user to complete the transaction. In this VTS mode, the user might not need to physically interact with the VTS to complete the transaction. When the transaction is fulfilled, the video agent may end the video call in step 1621.

In a cardless transaction 1625, the user may touch the screen at the VTS (or a tactile button) to initiate a transaction. A transaction list, such as the transactions listed in Table 3 above (in addition to other non-video and/or video transactions), may be presented to the user in step 1629. In step 1631, the VTS may determine whether a transaction has been selected by the user. If a transaction has not been selected and a predetermined time period has been exceeded, the VTS may initiate a timeout process in step 1633. The VTS may display the attract sequence in step 1637 (e.g., a welcome screen, advertisements, and the like). If a transaction has been selected, the VTS may initiate the video transaction and connection in step 1617 and a video agent may conduct the requested transaction for the user, as previously described. In step 1623, the VTS may determine whether the transaction was initiated as a cardless session. If the session was a cardless session, the VTS may display the attract sequence in step 1637. If the session was a card transaction, on the other hand, the VTS may return to step 1609 to present a list of on us transactions available to the user. The user may select another transaction because the VTS has previously authenticated the user in step 1607.

Figure 17:
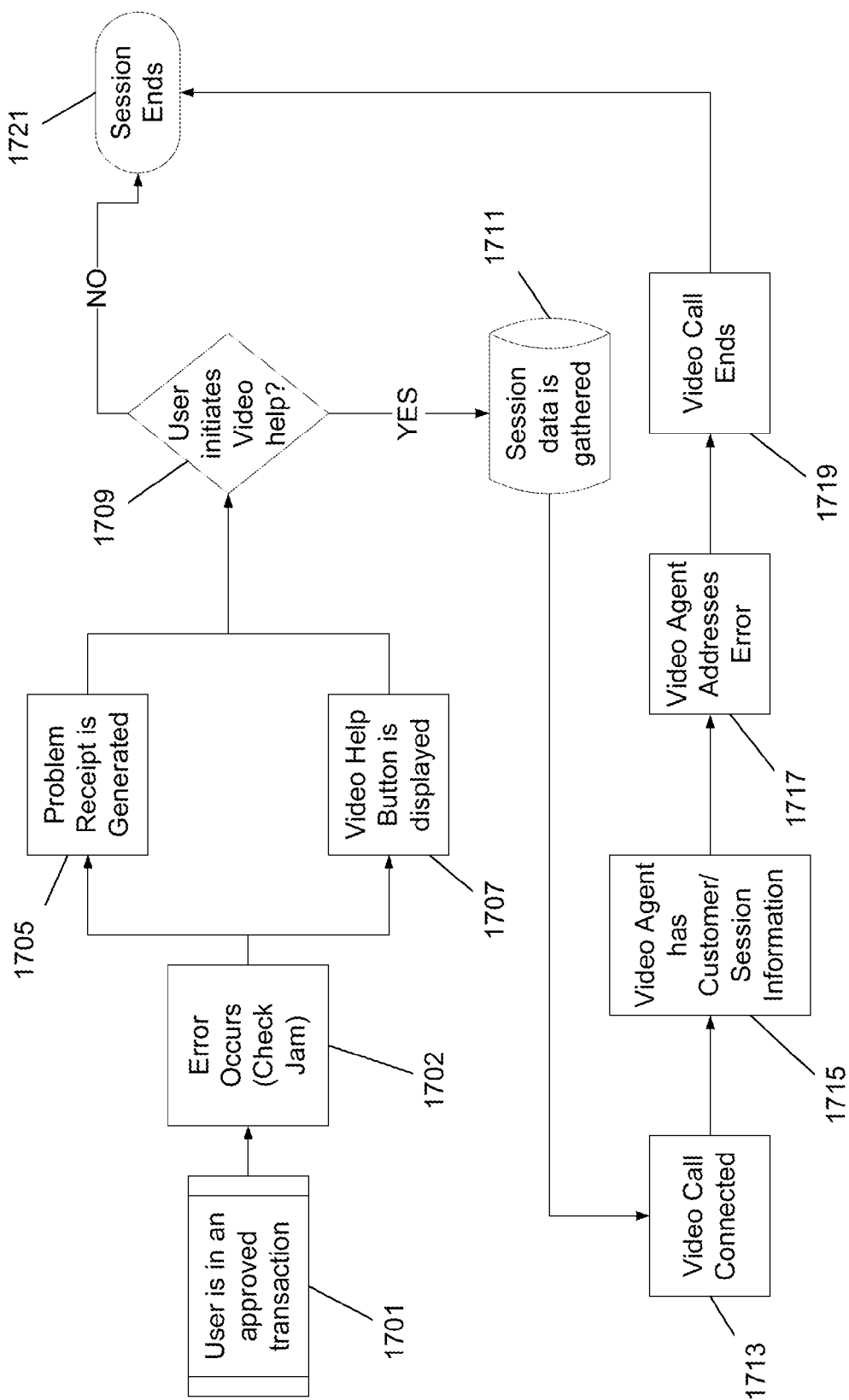
FIG. 17 is a flow chart showing an example error process flow.

FIG. 17 is a flow chart showing an example flow of how an error may be handled at a VTS. While the example of FIG. 17 refers to a fully automated transaction, the video agent may also have all the same ability to resolve customer issues should they occur during a video enabled transaction. The user may be in an approved transaction 1701, such as a check deposit. In step 1702, the VTS 101 may determine that an error has occurred, such as a jammed check. VTS 101 may generate a problem receipt in step 1705. The receipt may indicate a telephone number to call to resolve the error, time of the error, the type of error, customer information, and the like. In step 1707, VTS 101 may also display a video help button. In step 1709, the VTS may determine whether the user has initiated a video help using the video help button. If not, the VTS may end the session in step 1721. If the user has initiated video help, the VTS may gather session data on the transaction from in step 1711. In step 1713, the VTS may be connected to a video agent terminal to connect a video call. In step 1715, the video agent may be provided with session data (e.g., customer and transaction information). The data may be displayed on the video agent's terminal. In step 1717, the video agent may address the error. For example, if the error is a jammed check, the video agent may send a technician to the VTS to remove the jam. The agent may indicate to the user that a technician has been dispatched. The video agent may directly address some errors without dispatching a technician. For example, if a component (e.g., a cash dispenser) at the VTS has malfunctioned, the video agent may reset the component (e.g., reset the software, hardware, and/or firmware associated with the cash dispenser). When the error has been addressed, the video call may end at step 1719.

Figure 18:
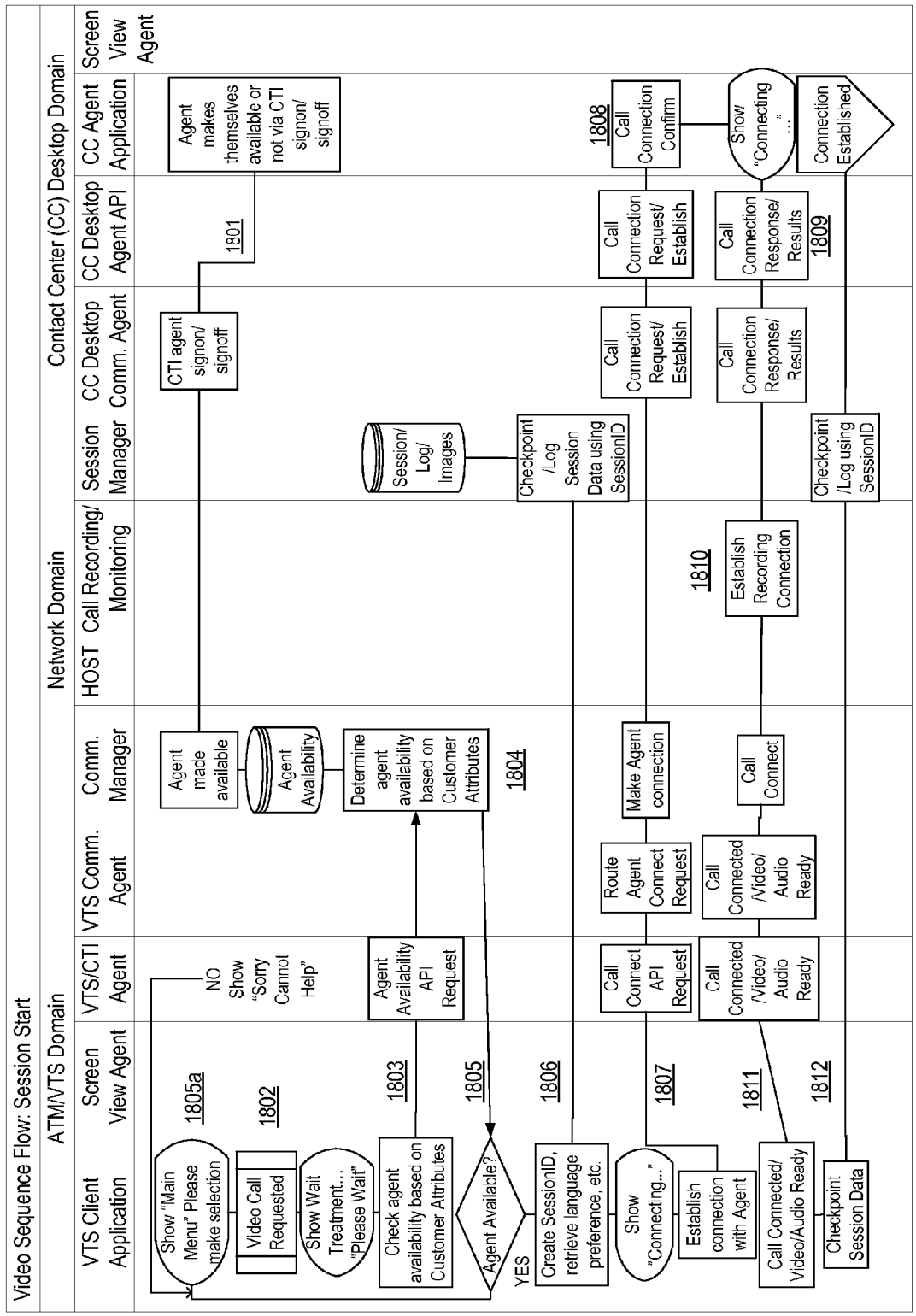
FIG. 18 is a flow chart showing an example of a video sequence flow for the start of a video session.

FIG. 18 is a flow chart showing an example of a video sequence flow for the start of a video session, during an initial call connect request originating from a customer at a VTS such as VTS 101.

Flow 1801—video agent availability login: Video agents may make themselves available to take VTS specific call requests. Note that this functionality may be dependent on what systems and applications are available to determine agent availability. The system that handles agent availability may interface with communications manager application in order to "determine" agent availability. For example, a video agent may need to log into a specific agent portal, however, it may be desirable to integrate agent availability in to a common infrastructure.

Flow 1802—video call requested: At some point at the VTS, a customer may request help using a button on the screen that calls a video agent. Whether this help request is issued during or before a transaction is a matter of user interface and work flow design. The system may be able to handle one or both types of scenarios, for example, a help request issued with no initial transaction request from the user as well as the ability to handle call requests during a transaction workflow (i.e. as the result of a hardware failure for instance).

Flows 1803 and 1804—determine "initial" agent availability: When a call request is made, the VTS may determine initial video agent availability. This may involve a two-step process, e.g., the first step being to determine quickly whether or not there is "general" availability for a call request, for example, is the call within supported hours, is there a long hold time, and the like. The second step (described later in flow #7, "Agent Call Connection") may be the actual "Connection" attempt based on a high probability that an agent will be found.

Flow 1805—"initial" agent availability response: Based on the availability rules in effect at the time of the call request, agent availability may be returned to the VTS. If there is no availability, this is an opportunity of the VTS to offer alternative flows to the customer. If there is availability, the VTS can indicate to the customer that there is some availability and that the system is now connecting. There could be a display of current hold times for example and offer the customer a choice to continue or not. If the customer is currently in the middle of a transaction (i.e. cash jam scenario), the customer may choose to wait for an available agent and/or accept voice only for example.

Flow 1806—checkpoint session data: The VTS may checkpoint and/or log specific session data to the "Session Manager". The Session Manager may provide logging, session context sharing, and image storage functions. The Session Manager may facilitate the transfer of information from the VTS to one or potentially many different agents.

As described below, flows 1807-1811 illustrate examples of actual steps that may be implemented to establish a call connection and setup the audio/video connections.

Flow 1807—agent call connection: The initial call request to communications system using an API, for example. At this point a customer may simply see "Connecting . . . " type of wait treatment.

Flows 1808 and 1809—VTS/video agent call negotiation/connect: High-level protocol and negotiation requirements may be used to establish the audio/video call between the VTS and the video agent. This is a step in the flow where the video agent may be directly involved with the connection process. In this case, CTI framework may have already determined agent availability and may now be attempting to connect to the agent. The agent may be presented some form of "Accept Call" treatment on the desktop client, for example "You have a call incoming from VTS 123, do you want to accept this call?"

Flow 1810—setup call recording solution recording connection: The communications between the customer of the VTS and the video agent may be recorded for future reference. This may be useful, for instance, where deception or a mistake is later detected (e.g., post-transaction) and the recorded call may be reviewed to assist with resolution of the deception or mistake.

Flow 1811—VTS/agent connection established: The VTS may receive a response to the call request that an agent has confirmed the call request and that the connection is now established. At this point the audio/video channels can be manipulated by the VTS directly or via the command and control functionality on the agent client desktop, which is described in the "Video Call Connected" narrative section.

Flow 1812—checkpoint session data "post connection": The VTS may send any session data that may be useful to the video agent to determine and/or troubleshoot the customer issue. The data here may be accessed directly from the agent desktop and is described under the next sections.

Figure 19:
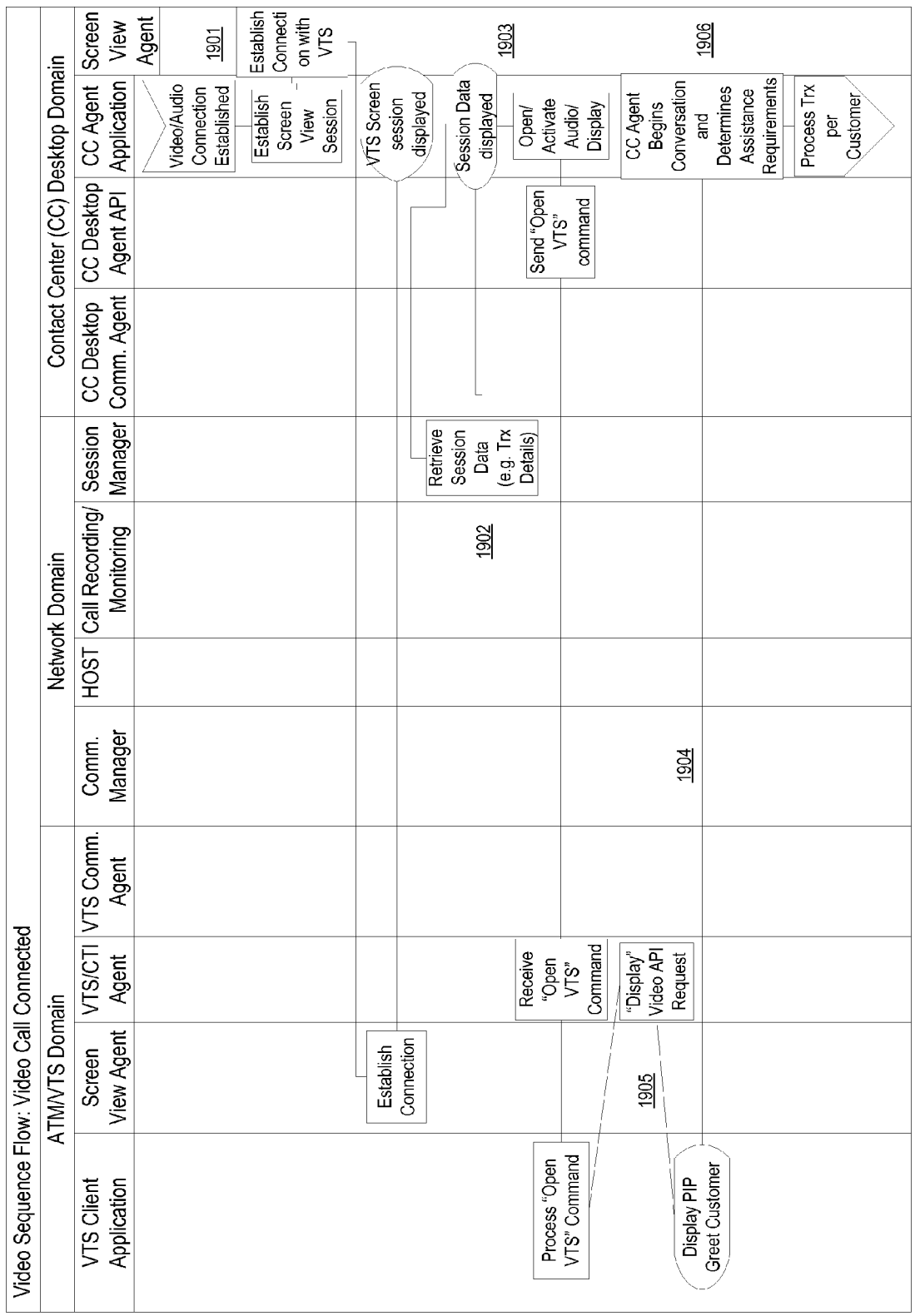
FIG. 19 is a flow chart showing example steps that may be performed following the initial call connect request.

FIG. 19 is a flow chart showing example steps that may be performed following the initial call connect request. This may be a continuation of the "Session Start" flows of FIG. 18. These "Post" connection steps may be isolated to access of the initial session data that a video agent would use to begin a conversation with the customer.

Flow 1901—establish Video screen sharing: Screen sharing may be established and originated by the video agent. Once a connection has been established, session data is known, audio/video channels are open, and other operations are completed, the video agent can attempt to "See" what's going on at the VTS.

Flows 1902 and 1903—retrieve session data: The contact agent (video agent) desktop application may retrieve session related data and display it. The agent is now able to determine some initial context of the call request, including transaction information, location, any errors, and the like.

Flows 1904 and 1905—open VTS command: This may be the first opportunity where the contact agent desktop application leverages the command and control message bridge to send a specific command to the VTS. In this example, the video agent is issuing an "Open VTS" command which would instruct the VTS to display the PIP, open the audio channel, and perform other similar actions.

Figure 20:
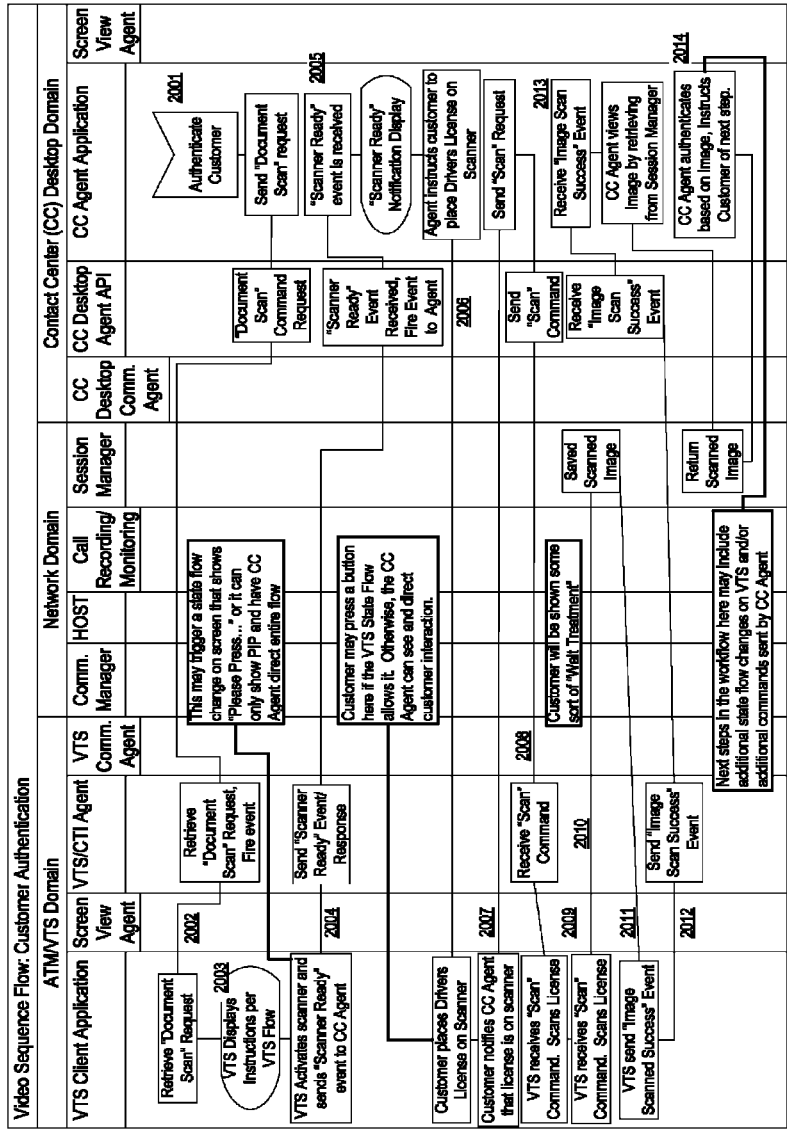
FIG. 20 is a flow chart showing an example of "Customer Authentication" flows.

FIG. 20 is a flow chart showing an example of "Customer Authentication" flows, which may involve various example features/functions that may be used to achieve control and troubleshooting functions to facilitate a customer issue at the VTS. FIG. 20 specifically describes an example customer authentication scenario, which may be used as a template for other interaction scenarios. This scenario is sufficient to point out the main highlights of the problem domain and how these functions can operate.

Flow 2001—Start Authentication Process: This scenario begins showing that the video agent may authenticate the customer using a driver's license scan. The video agent has determined that in order to proceed, the customer will need to present their driver's license to the video agent. In order to accomplish this, the video agent may need to guide the customer through the document scanning process, which may include interaction over the audio/voice channel, video channel, as well as the command and control channel to support workflow and/or device requests and responses. The video agent may begin this interaction with a request to the VTS to start the document scanning workflow. This will be referred to herein as the "Document Scan" request, and it shows the request being handled in this example by the command and control channel provided by an messaging bridge implementation. At any point during the workflow, either the VTS or contact agent desktop may initiate session storage requests and/or logging type requests to the session manager.

Flow 2002—Scan Request Received: The document scan request may be received through a messaging bridge. This command request may then be sent by a desktop agent component to the VTS client application to signal the request receipt.

Flow 2003—Start Scan Document Workflow: Once the scan document request is received, the VTS client application (i.e. state machine) may follow an appropriate flow for the interaction. In this example, the VTS client application would display a wait treatment such as "Please wait while the document scanner is activated . . . ". Additionally, the VTS client application may then activate the document scanner device locally and wait for the activation response. The VTS may display to the customer various messages and/or options.

Flow 2004—Scanner Ready Response: The activation results of the scanner device may be sent to the contact agent application via the messaging bridge implementation in this example. At this point in the flow, the customer may simply be talking with the video agent and waiting for further instructions.

Flows 2005 and 2006—Scanner Ready: The "Scanner Ready" response event may be received by the communications agent on the contact agent desktop in this example. The agent forwards the event to the original caller, in this case the financial institution contact agent application that made the original scanner activate request. At this point the video agent can instruct the customer to proceed based on the success/fail completion of the activate request. In this example, the instructions the video agent may provide would include instructing the customer to place their driver's license in/on the scanner device.

Flows 2007-2009—Scan Document Request: Once the document scanner is ready and the video agent has instructed the customer to proceed, the customer can notify the video agent that the document (i.e. license) has been placed in/on the scanner (or, perhaps the scanner may fire an event that notifies of a document ready). In either case, the document may be signaled as ready to be scanned, at which point either the VTS itself can instruct the scanner to process the scan, or the video agent can send a "Scan Request" via the message bridge framework (e.g., Command/Control framework) to cause the scanner to scan the document. Again, this interaction may be similar to all such device interactions, where a command is executed and a response received. The command can be sent either locally by the VTS client (i.e. state machine) or externally by the video agent.

Flows 2010-2012—Send Scan Image: This flow illustrates a technique to send images (i.e. scanned documents and/or check images) to the video agent for analysis during the customer interaction. Once an image is available it is sent to the "Session Management" service which stores the image for later retrieval. In this example, after the document is scanned, the image is sent to the Session Manager along with any other meta data necessary. Once the image has been sent, a notification event is sent to the video agent to signal that the image is ready to be viewed. Again, this particular event flow would be handled by the message bridge in this example.

Flows 2013—Image Ready for Review: Once the contact agent desktop application is notified that the image is ready to be viewed, the video agent can view the image by accessing the image from the Session Manager. How the agent is notified and how they view the image will be covered in other design sessions and not within the scope of this document.

Flow 2014—Complete Scan Image Review: After the document is reviewed, the video agent may perform additional functions and procedures with the VTS client and/or customer. The video agent can pause video, send additional commands, wait for responses, wait for documents, and the like. Additionally, the video agent may interact with other external systems at this point to gather more information and/or troubleshoot an issue. All of these types of features/functions would re-use many of the flows already described.

Figure 21:
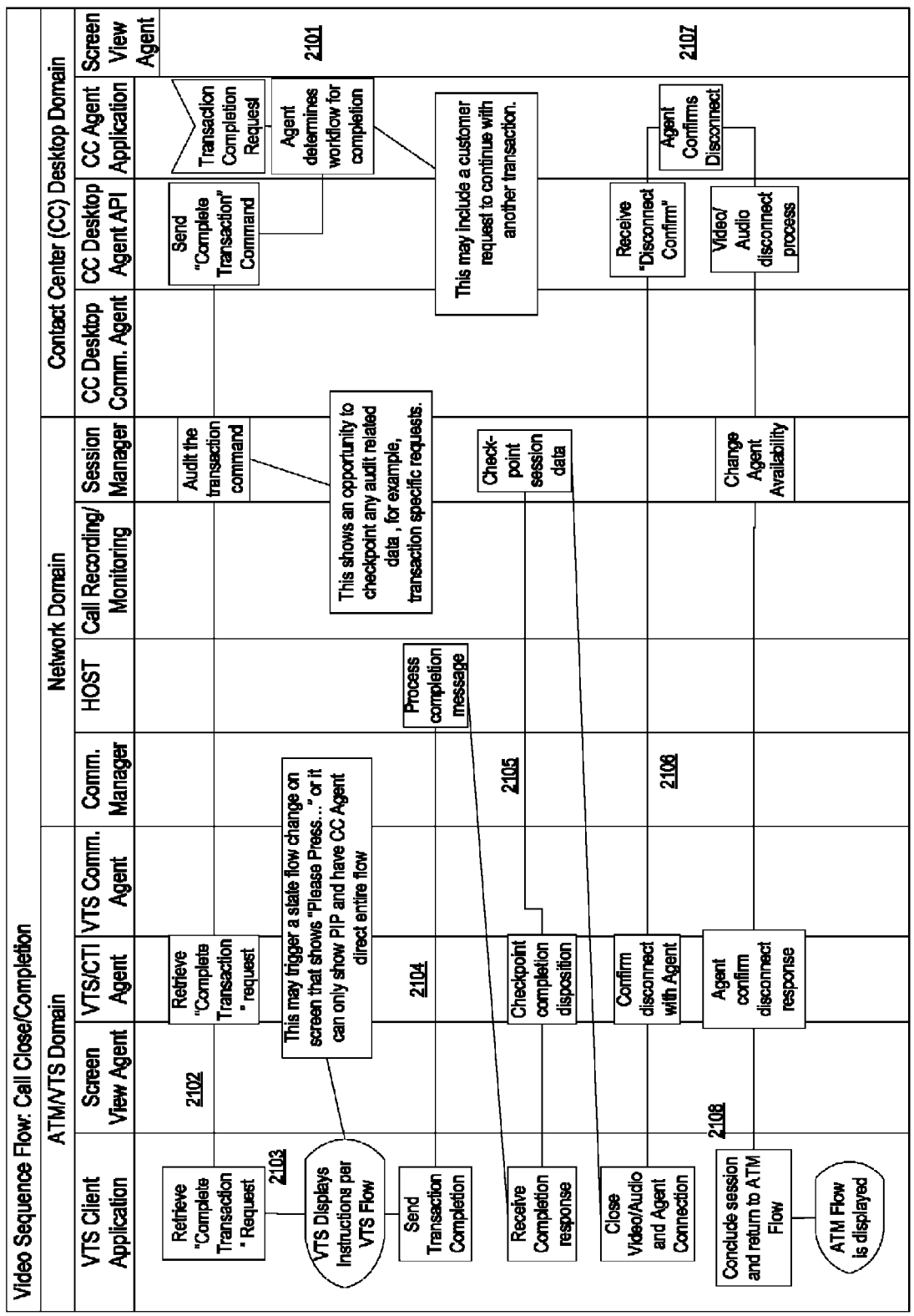
FIG. 21 is a flow chart of example a "Call Close/Completion" sequence that describes various highlights of an example termination process.

FIG. 21 is a flow chart of example a "Call Close/Completion" sequence that describes various highlights of an example termination process. At some point during the workflow, one or more transactions may be completed and/or the session may be closed. There may be some collaboration between the agent desktop application and the VTS to accomplish various commands and responses to coordinate a proper completion flow.

Flow 2101—Agent Determines Workflow for Completion: The video agent may determine from the customer whether or not another transaction is needed. If the session needs to be closed, the video agent may initiate this process by sending a completion request directly to the VTS. However, there may be intermediary check pointing of session data for auditing as well as call recording (as discussed previously) during any or all of the following steps. Also note that tearing down of communication channels, i.e. video and/or audio may be orchestrated during these steps.

Flows 2102 and 2103—VTS Receives Completion Request: The VTS may receive a completion request and begin the workflow needed to accomplish the request. There may be wait treatment displayed to the customer at this point or there may be a combination of video agent instructions along with VTS specific instructional displays.

Flows 2104 and 2105—ATM host Transaction Completion: The VTS may send some form of completion/disposition data to the ATM host. This interaction may occur at other locations within the flow as well and is mentioned here as a possible location. Any interactions with the ATM host may also be precluded by check pointing these requests/responses to the session manager, which would allow for auditing and/or recovery point information. For example, a disconnected customer may need to be re-routed to another agent and the session data will need to identify the current state of the transaction flow.

Flow 2106—Confirm Agent Completion: The VTS may send some sort of completion confirmation request to the video agent to confirm a disconnect. For example, there may be problems/issues with the completion that the video agent needs to confirm prior to tearing down the session.

Flow 2107—Agent Confirms Completion: The video agent may confirm the completion confirmation request which initiates the communication tear down. This flow may incorporate final discussion with the customer for example, prior to final disconnect of video/audio.

Flow 2108—VTS Starts ATM Flow: The VTS flow may transition to the "ATM based" workflow and state machine.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present disclosure.

The invention claimed is:

1. A method comprising:
during a transaction between a user and a self-service video transaction device, detecting, by a computing device, an error associated with the transaction;
in response to detecting the transaction error, identifying, by the computing device, a video agent terminal comprising video and audio functionalities to service the transaction error;
determining, by the computing device, whether a wait time for connection to the video agent terminal exceeds a predetermined threshold time;
if the wait time exceeds the predetermined threshold time, generating an error receipt comprising an identifier for the transaction error and contact information for resolution of the transaction error; and
sending an instruction to the self-service video transaction device to print the error receipt.

2. The method of claim 1, further comprising:
if the wait time does not exceed the predetermined threshold time, displaying, on a display device of the self-service video transaction device, an option to connect to the video agent terminal.

3. The method of claim 2, further comprising:
in response to receiving a selection of the option to connect to the video agent terminal, connecting the self-service video transaction device to the video agent terminal when the video agent terminal becomes available,
wherein the connection includes video and audio functionalities.

4. The method of claim 3, further comprising:
in response to receiving the selection of the option to connect to the video agent terminal, transmitting the transaction error identifier and an indication of the time of the transaction error to the video agent terminal.

5. The method of claim 1, wherein identifying the video agent terminal to service the transaction error includes:
retrieving profile information for a video agent associated with the video agent terminal;
comparing the transaction error identifier to the video agent's profile information; and
in response to determining that the transaction error identifier matches the video agent's profile information, identifying the video agent terminal to service the transaction error.

6. The method of claim 1, further comprising:
subsequent to determining that the wait time exceeds the predetermined threshold time, determining that the wait time has fallen below the predetermined threshold time during the transaction; and
in response to determining that the wait time has fallen below the predetermined threshold time during the transaction, displaying, on a display device of the self-service video transaction device, an option to connect to the video agent terminal.

7. The method of claim 1, wherein:
identifying the video agent terminal includes identifying a plurality of video agent terminals to service the transaction error, and
determining whether the wait time exceeds a predetermined threshold time includes determining whether the wait time for the next available agent of the plurality of video agents exceeds the predetermined threshold time.

8. A non-transitory computer readable medium storing computer-readable instructions that, when executed by a computing device, cause the computing device to:
during a transaction between a user and a self-service video transaction device, detect an error associated with the transaction;
in response to detecting the transaction error, identify a video agent terminal comprising video and audio functionalities to service the transaction error;
determine whether a wait time for connection to the video agent terminal exceeds a predetermined threshold time;
if the wait time exceeds the predetermined threshold time, generate an error receipt comprising an identifier for the transaction error and contact information for resolution of the transaction error; and send an instruction to the self-service video transaction device to print the error receipt.

9. The non-transitory computer readable medium of claim 8, storing additional instructions that, when executed by the computing device, cause the computing device to:
if the wait time does not exceed the predetermined threshold time, cause a display device of the self-service video transaction device to display an option to connect to the video agent terminal.

10. The non-transitory computer readable medium of claim 9, storing additional instructions that, when executed by the computing device, cause the computing device to:
in response to receiving a selection of the option to connect to the video agent terminal, connect the self-service video transaction device to the video agent terminal when the video agent terminal becomes available,
wherein the connection includes video and audio functionalities.

11. The non-transitory computer readable medium of claim 10, storing additional instructions that, when executed by the computing device, cause the computing device to:
in response to receiving the selection of the option to connect to the video agent terminal, transmit the transaction error identifier and an indication of the time of the transaction error to the video agent terminal.

12. The non-transitory computer readable medium of claim 8, storing additional instructions that, when executed by the computing device, cause the computing device to:
retrieve profile information for a video agent associated with the video agent terminal;
compare the transaction error identifier to the video agent's profile information; and
in response to determining that the transaction error identifier matches the video agent's profile information, identify the video agent terminal to service the transaction error.

13. The non-transitory computer readable medium of claim 8, storing additional instructions that, when executed by the computing device, cause the computing device to:
subsequent to determining that the wait time exceeds the predetermined threshold time, determine that the wait time has fallen below the predetermined threshold time during the transaction; and
in response to determining that the wait time has fallen below the predetermined threshold time during the transaction, cause a display device of the self-service video transaction device to display an option to connect to the video agent terminal.

14. The non-transitory computer readable medium of claim 8, wherein:
identifying the video agent terminal includes identifying a plurality of video agent terminals to service the transaction error, and
determining whether the wait time exceeds a predetermined threshold time includes determining whether the wait time for the next available agent of the plurality of video agents exceeds the predetermined threshold time.

15. An apparatus comprising:
a processor; and
memory storing computer-readable instructions that, when executed by the processor, cause the apparatus to:
during a transaction between a user and a self-service video transaction device, detect an error associated with the transaction;
in response to detecting the transaction error, identify a video agent terminal comprising video and audio functionalities to service the transaction error;
determine whether a wait time for connection to the video agent terminal exceeds a predetermined threshold time;
if the wait time exceeds the predetermined threshold time, generate an error receipt comprising an identifier for the transaction error and contact information for resolution of the transaction error; and
send an instruction to the self-service video transaction device to print the error receipt.

16. The apparatus of claim 15, wherein the memory stores additional instructions that, when executed by the processor, cause the apparatus to:
if the wait time does not exceed the predetermined threshold time, cause a display device of the self-service video transaction device to display an option to connect to the video agent terminal.

17. The apparatus of claim 16, wherein the memory stores additional instructions that, when executed by the processor, cause the apparatus to:
in response to receiving a selection of the option to connect to the video agent terminal, connect the self-service video transaction device to the video agent terminal when the video agent terminal becomes available,
wherein the connection includes video and audio functionalities.

18. The apparatus of claim 17, wherein the memory stores additional instructions that, when executed by the processor, cause the apparatus to:
in response to receiving the selection of the option to connect to the video agent terminal, transmit the transaction error identifier and an indication of the time of the transaction error to the video agent terminal.

19. The apparatus of claim 15, wherein the memory stores additional instructions that, when executed by the processor, cause the apparatus to:
retrieve profile information for a video agent associated with the video agent terminal;
compare the transaction error identifier to the video agent's profile information; and
in response to determining that the transaction error identifier matches the video agent's profile information, identify the video agent terminal to service the transaction error.

20. The apparatus of claim 15, wherein the memory stores additional instructions that, when executed by the processor, cause the apparatus to:
subsequent to determining that the wait time exceeds the predetermined threshold time, determine that the wait time has fallen below the predetermined threshold time during the transaction; and
in response to determining that the wait time has fallen below the predetermined threshold time during the transaction, cause a display device of the self-service video transaction device to display an option to connect to the video agent terminal.

* * * * *